United States Patent
Wakayama et al.

(10) Patent No.: US 8,542,409 B2
(45) Date of Patent: Sep. 24, 2013

(54) PRINTING APPARATUS, PRINTING METHOD AND METHOD OF GENERATING DITHER MASK

(75) Inventors: Takuya Wakayama, Shiojiri (JP); Satoshi Yamazaki, Matsumoto (JP); Toshiaki Kakutani, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 753 days.

(21) Appl. No.: 12/755,197

(22) Filed: Apr. 6, 2010

(65) Prior Publication Data

US 2010/0259793 A1  Oct. 14, 2010

(30) Foreign Application Priority Data

Apr. 8, 2009 (JP) ................................. 2009-094291
Mar. 30, 2010 (JP) ................................. 2010-076896

(51) Int. Cl.
*H04N 1/40* (2006.01)
*G06K 9/20* (2006.01)
*B41J 2/205* (2006.01)

(52) U.S. Cl.
USPC ........ 358/3.13; 358/3.14; 358/3.03; 382/283; 347/15; 347/240

(58) Field of Classification Search
None
See application file for complete search history.

(56) References Cited

U.S. PATENT DOCUMENTS

| | | | | |
|---|---|---|---|---|
| 6,963,423 B2 * | 11/2005 | Ogasahara et al. | ............ | 358/1.8 |
| 7,387,355 B2 * | 6/2008 | Kakutani | ......................... | 347/15 |
| 7,889,389 B2 * | 2/2011 | Kakutani | ....................... | 358/1.9 |
| 7,961,350 B2 * | 6/2011 | Kakutani | ....................... | 358/1.9 |
| 2005/0219623 A1 * | 10/2005 | Hiramoto et al. | ............ | 358/3.06 |
| 2008/0266608 A1 * | 10/2008 | Yamazaki et al. | ............ | 358/3.06 |

FOREIGN PATENT DOCUMENTS

| | | |
|---|---|---|
| JP | 2007-049443 A | 2/2007 |
| JP | 2007-116432 A | 5/2007 |

OTHER PUBLICATIONS

Makoto Fujino, "Image Qualiy Evaluation of Inkjet Prints", Japan Hardcopy '99, pp. 291-294, 1999, Japan.

* cited by examiner

*Primary Examiner* — Steven Kau
(74) *Attorney, Agent, or Firm* — Global IP Counselors, LLP

(57) ABSTRACT

A printing apparatus is provided with a halftone unit performing a halftone process in which a possibility of dot formation is determined for each pixel based on a dot occurrence rate of the pixel constituting image data, and a printing unit forming dots on a recording medium based on the possibility of dot formation. The halftone unit predicts the occurrence of dot overlap in which a plurality of dots overlaps on the printing medium and performs the halftone process based on an evaluation index according to the dot overlap.

5 Claims, 24 Drawing Sheets

| 1 | 1 | 0 | 1 | 0 | 0 | 0 | 1 |
|---|---|---|---|---|---|---|---|
| 0 | 0 | 1 | 0 | 0 | 0 | 1 | 0 |
| 1 | 0 | 0 | 0 | 0 | 1 | 0 | 0 |
| 0 | 0 | 1 | 0 | 1 | 0 | 0 | 1 |

DOT SHAPE TO BE ADDED
DOT SHAPE TO BE ASSUMED

7B

| 2 | 2 | 3 | 1 | 1 | 0 | 2 | 1 |
|---|---|---|---|---|---|---|---|
| 2 | 2 | 1 | 2 | 0 | 2 | 1 | 2 |
| 1 | 1 | 2 | 0 | 2 | 1 | 2 | 1 |
| 1 | 1 | 1 | 2 | 1 | 2 | 1 | 1 |

GD8

7C

| 1 | 1 | 1 | 0 | 0 | 0 | 1 | 0 |
|---|---|---|---|---|---|---|---|
| 1 | 1 | 0 | 1 | 0 | 1 | 0 | 1 |
| 0 | 0 | 1 | 0 | 1 | 0 | 1 | 0 |
| 0 | 0 | 0 | 1 | 0 | 1 | 0 | 0 |

PRINTING APPARATUS, PRINTING METHOD AND METHOD OF GENERATING DITHER MASK

CROSS-REFERENCE TO RELATED APPLICATIONS

The entire disclosure of Japanese Patent Application No.: 2009-094291, filed Apr. 8, 2009 and 2010-076896, filed Mar. 30, 2010 are expressly incorporated by reference herein.

BACKGROUND

1. Technical Field

The present invention relates to a printing apparatus, a printing method, and a method of generating a dither mask.

2. Related Art

There is suggested a technique of optimizing a dither mask by dividing mask pixels forming the dither mask into a plurality of groups according to dot formation timings so as to suppress granularity for all of the groups and for each group (refer to JP-A-2007-49443).

SUMMARY

There is a case where a dot overlap is generated by a plurality of dots because dots are formed with high density in an actual printing. In addition, problems such as uneven density, uneven color, and uneven brightness on a printed result are caused depending on generation conditions of the dot overlaps. When a print head reciprocates in a main scanning direction and performs printing by ejecting ink drops at the same time, there is a case where deviation occurs in positions of dots formed during forward movement and dots formed during rearward movement of the print head. There is a problem that a dot overlap is generated according to the deviation, and thereby, uneven density, uneven color, and uneven luster occur.

An advantage of some aspects of the invention is that it suppresses the uneven density, uneven color, and uneven luster in printing.

In order to solve at least a part of problems described above, a printing apparatus of the invention is provided with a halftone unit that performs a halftone process in which the possibility of dot formation is determined for each pixel based on a dot occurrence rate of the pixel constituting image data, and a printing unit that forms dots on a recording medium based on the possibility of the dot formation. In addition, the halftone unit predicts the occurrence of dot overlap in which a plurality of dots overlap on the recording medium, and performs the halftone process based on an evaluation index which is in accordance with the dot overlap. Accordingly, the occurrence of dot overlap can be suppressed, or printing can be realized which suppresses the influence of the dot overlap on a print result even when the dot overlap has occurred. Therefore, uneven density, uneven color, and uneven luster can be suppressed.

Particularly, by employing an evaluation index, as the evaluation index, based on the dispersibility of the dot overlap on the recording medium, printing can be realized which suppresses the influence of the dot overlap on a print result even when the dot overlap has occurred. In other words, when the dot pair is generated concentrating regionally, the phenomenon is noticeable as deterioration of image quality, but when the dot pair is dispersed, adverse influence caused by the dot overlap on image quality is hardly noticeable. In addition, since the concentration of ink drops can be suppressed, defects in the course of dot formation such as ink blots can also be suppressed.

Furthermore, the occurrence and non-occurrence of the dot overlap when deviation in a dot position occurs may be predicted. Accordingly, not only are the dots formed in the normal positions, but also uneven density, uneven color, and uneven luster can be suppressed even when deviation in the dot positions occurs. For example, when a print head is provided which ejects ink drops during main scanning over plural times, the occurrence of position deviation between dots formed in each main scanning can be predicted.

Furthermore, when the printing apparatus of the invention is provided with a print head which ejects ink drops during main scanning in the forward direction and rearward direction, the occurrence of deviation in dot positions as above can be predicted. In other words, it is assumed that a position of a dot formed by ink drops ejected during main scanning in the forward direction is relatively deviated from a position of a dot formed by ink drops ejected during main scanning in the rearward direction (position deviation between main scanning directions). If dot overlap caused by such position deviation between main scanning directions is predicted and the evaluation index is obtained, a printing apparatus which ejects ink drops during main scanning in the forward direction and rearward direction can realize excellent image quality.

Furthermore, when the position deviation between main scanning directions is assumed, the evaluation index as below can be employed. In other words, the evaluation index can be employed which is based on the number of dot pairs that generates the dot overlap in which dots approximate to each other being greater in a case where a position deviation between the main scanning directions occurs than in a case where a position deviation between the main scanning directions does not occur, and the number of dot pairs that are far from each other is greater in a case where a position deviation between the main scanning directions occurs than in a case where a position deviation between the main scanning directions does not occur when the position deviation between main scanning directions occurs. When the dot overlap in which dots approximate to each other occurs to a greater extent in a case where a position deviation in the main scanning direction occurs than in a case where a position deviation in the main scanning direction does not occur, an area covered by the dots is reduced more in the former case than in the latter case, but variation in the covered area can be suppressed by evaluating the number of dot pairs, which are the cause of such dot overlap.

In addition, the evaluation index can be obtained based not only on the dot overlap caused by deviation in dot positions but also dot overlap between plural inks (dot overlap between inks). Accordingly, the occurrence of dot overlap between inks is suppressed and spatially dispersed, thereby obtaining an excellent print result. It is preferable to independently form dots of each ink, which is because mixing with different inks causes unintended print results (such as color appearance). In addition, ink blots between plural inks or the like can be suppressed by spatially dispersing dot overlap between inks.

Furthermore, the evaluation index may be obtained taking the dot overlap caused by dot shapes into consideration. In actual printing, a dot of a bigger size than one pixel in print resolution can be considered. In other words, when dots are to be formed in a certain pixel, expansion of the dots into peripheral pixels can be considered. The dot overlap occurs more easily when dots expands than when dots do not expand. Therefore, it is preferable to predict the occurrence of dot overlap taking the dot shapes into consideration.

Furthermore, the invention can be realized by a halftone technique in either of an error diffusion method or a dithering method. In other words, in the dithering method, a halftone process based on the evaluation index can be realized by generating a dither mask based on the evaluation index in advance and using the dither mask in the halftone process. On the other hand, in the error diffusion method, a halftone process based on the evaluation index can be realized by changing a threshold value for determining the possibility of dot formation according to the evaluation index.

In the error diffusion method, when dot overlap between inks or dot overlap caused by the dot shapes for a pixel of interest is generated, it may be possible to make difficult the generation of the dot overlap between inks or the dot overlap caused by the dot shapes for pixels around the pixel of interest. Specifically, the threshold value for the pixels around the pixel of interest may be adjusted so that the dot overlap between inks or the dot overlap caused by the dot shapes is not easily generated.

Furthermore, a printing apparatus of the invention is provided with a halftone unit that performs a halftone process in which the possibility of dot formation is determined for each pixel based on a grayscale value of the pixel constituting image data, and a print controlling unit that causes dot formation on a recording medium based on the possibility of the dot formation by causing a print head which ejects ink drops during main scanning in a first direction and ejects ink drops during main scanning in a second direction, which is opposite to the first direction to be driven. In the printing apparatus, the halftone unit obtains an evaluation index based on a target number which is set in advance for the number of dot pairs that generates dot overlap in which dots approximate to each other and overlap to a greater extent in a case where a position deviation between the dots occurs than in a case where the position deviation does not occur, and the number of dot pairs that are far from each other is greater in a case where a position deviation between the dots occurs than in a case where the position deviation does not occur, of which the dot pairs are constituted by dots formed by main scanning in the first direction and dots formed by main scanning in the second direction, and performs the halftone process based on the evaluation index.

According to the above configuration, since the possibility of dot formation is determined so that an occurrence number of dot pairs becomes an optimal number (target number), particularly, density variation in a grayscale range, where density varies significantly due to the influence of dot overlap in the occurrence of the position deviation in the related art, is properly suppressed.

A dithering method or an error diffusion method can be employed even when the halftone process is performed according to the target number of dot pairs as above. In the error diffusion method, the threshold value for determining the possibility of dot formation, of which dots constitute the dot pairs, varies according to the evaluation index. On the other hand, when the dithering method is employed, a dither mask, for which characteristics to generate the dot pairs are optimized based on the evaluation index, is generated in advance, and the possibility of dot formation is determined by using the generated dither mask.

One invention can be completed in the generation of a dither mask when the dithering method is employed. In other words, the configuration of the invention, which provides a method of generating a dither mask, of which the dither mask is used in a halftone process in which the possibility of dot formation is determined for each pixel based on a grayscale value of the pixel constituting image data, can be understood.

In the method, when a threshold value for determining the possibility of dot formation is accommodated in a mask pixel which constitutes the dither mask, an evaluation index is calculated every time the threshold value is accommodated in each mask pixel which can accommodate the threshold value, the evaluation index including an index indicating a difference between an occurrence number of dot pairs that generates dot overlap in which dots approximate each other and overlap to a greater extent in a case where a position deviation between the dots occurs than in a case where the position deviation does not occur, and an occurrence number of dot pairs that are far from each other is greater in a case where a position deviation between the dots occurs than in a case where the position deviation does not occur, of which the dot pairs are constituted by dots formed by main scanning in a first direction and dots formed by main scanning in a second direction, which is opposite to the first direction, during printing, and a target number of the dot pairs, which is set in advance according to the threshold value, and the threshold value are (finally) accommodated in a mask pixel corresponding to the minimum evaluation index. According to the configuration, a dither mask can be generated in which the occurrence number of dot pairs can be an optimal number when the number is used in the halftone process.

Furthermore, the invention can be realized not only in a printing apparatus but also a printing method including steps performed by each of units constituting the printing apparatus. Moreover, the invention can be realized in a printing program which executes functions of the units in a computer. In addition, the units constituting the printing apparatus can be installed in a plurality of devices (for example, a computer as a print controlling device and a printer) in a dispersed manner, and the printing method of the invention can be realized also by cooperation among the plurality of the devices.

BRIEF DESCRIPTION OF THE DRAWINGS

FIG. 6 is a diagram describing groups.

FIG. 7 is a diagram describing the addition of dot shapes.

DESCRIPTION OF EXEMPLARY EMBODIMENTS

Hereinafter, embodiments of the invention will be described according to the following order in order to clarify description of the invention by the action and effects thereof.
A. Composition of Apparatus and Printing Method:
B. Generation of Dither Mask:
C. Modified Examples:
   C-1. Modified Example 1:
   C-2. Modified Example 2:
   C-3. Modified Example 3:
   C-4. Modified Example 4:
   C-5. Modified Example 5:
   C-6. Modified Example 6:
   C-7. Modified Example 7:
   C-8. Modified Example 8:
   C-9. Modified Example 9:
   C-10. Modified Example 10:
   C-11. Modified Example 11:
   C-12. Modified Example 12:
   C-13. Modified Example 13:

A. Composition of Apparatus and Printing Method

Figure 1:
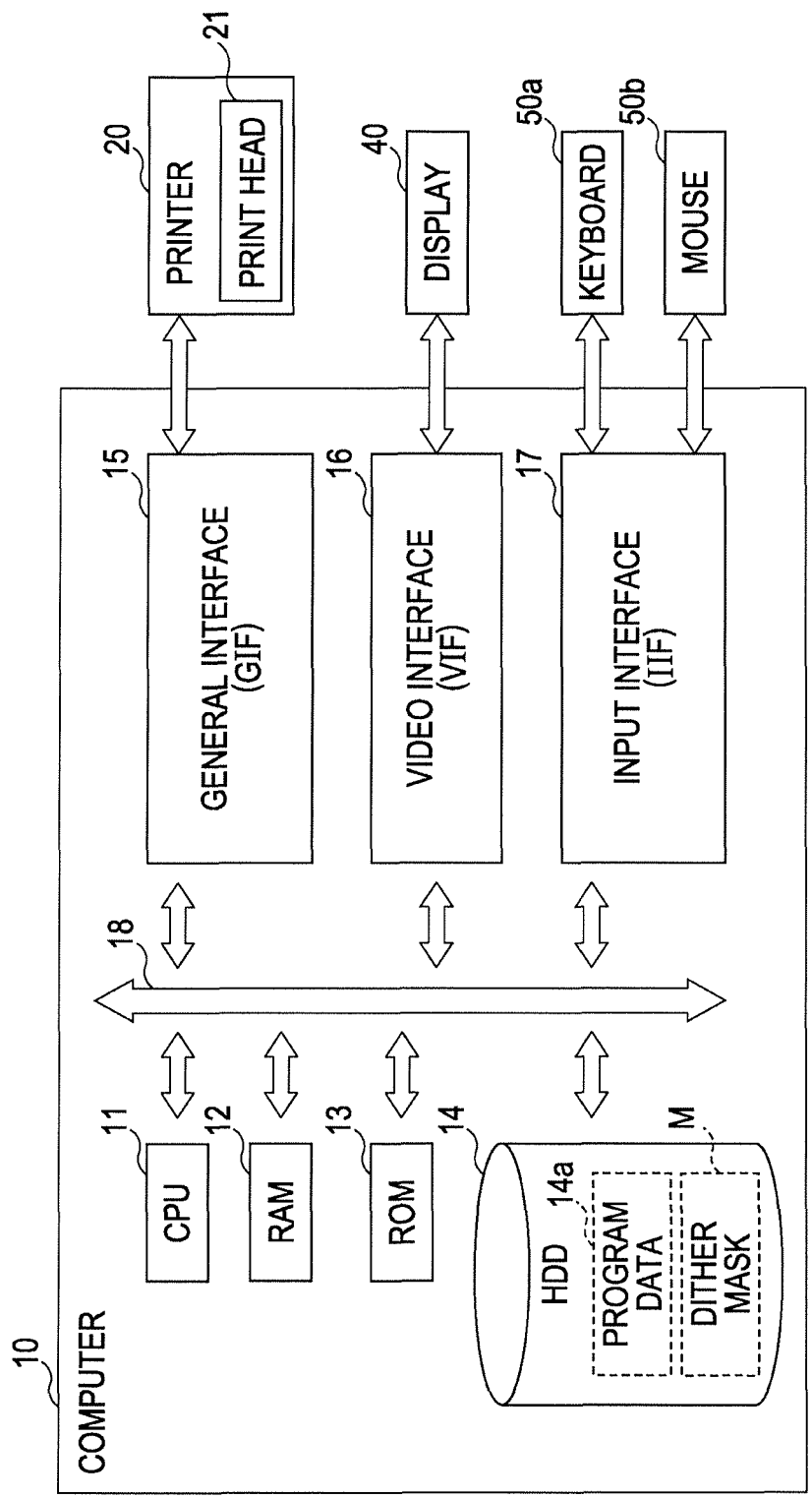
FIG. 1 is a composition diagram of hardware of a computer.

FIG. 1 shows an example of the composition of a computer that specifically realizes an image processing apparatus of the invention. In the same drawing, a computer 10 includes a CPU 11, a RAM 12, a ROM 13, a hard disk drive (HDD) 14, a general interface (GIF) 15, a video interface (VIF) 16, an input interface (IIF) 17, and a bus 18. The bus 18 enables the data communication among constituent components 11 to 17 forming the computer 10, and the communication is controlled by a chip set or the like (not shown). The HDD 14 stores program data 14a for executing various programs including an operating system (OS), and the CPU 11 executes calculation based on the program data 14a developing the program data 14a in the RAM 12.

The GIF 15 provides an interface based on, for example, the USB specification, and connects the computer 10 to an external printer 20. The VIF 16 connects the computer 10 to an external display 40, and provides an interface to display an image on the display 40. The IIF 17 connects the computer 10 to an external keyboard 50a and a mouse 50b, and provides an interface for the acquisition of an input signal from the keyboard 50a and the mouse 50b by the computer 10.

Figure 2:
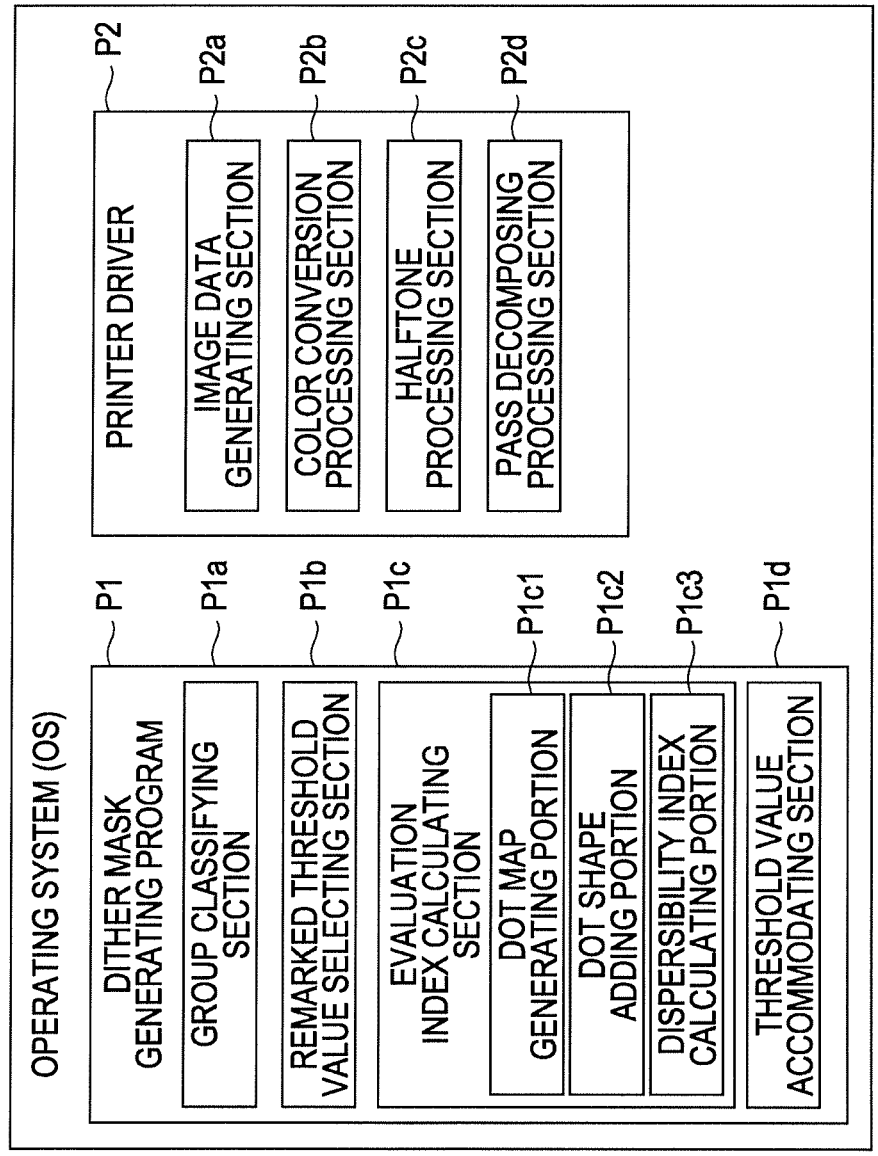
FIG. 2 is a composition diagram of software of the computer.

FIG. 2 shows the software composition of a program executed in the computer 10. In the same drawing, a dither mask generating program P1 and a printer driver P2 are executed on the operating system (OS). The OS provides an interface between each program. The dither mask generating program P1 includes a group classifying section P1a, a remarked threshold value selecting section P1b, an evaluation index calculating section P1c, and a threshold value accommodating section P1d. Furthermore, the evaluation index calculating section P1c includes a dot map generating portion P1c1, a dot shape adding portion P1c2, and a dispersibility index calculating portion P1c3. Details of processing executed by each of modules P1a to P1d forming the dither mask generating program P1 will be described with the flow of the processing. The printer driver P2 includes an image data generating section P2a, a color conversion processing section P2b, a halftone processing section P2c, and a pass decomposing processing section P2d.

The image data generating section P2a draws bit map data based on a command included in a printing job, and converts the size of an image of the bit map data (the number of pixels) so as to be appropriate for printing resolution. The color conversion processing section P2b performs conversion of the bit map data into image data (input image data) of which each pixel has a grayscale value of an ink amount (dot incidence rate) of ink that the printer 20 can eject. The halftone processing section P2c executes a halftone processing for input image data of each ink with a dither method. In the halftone processing, a dither mask M generated in advance by the dither mask generating program P1 is used.

Figure 3:
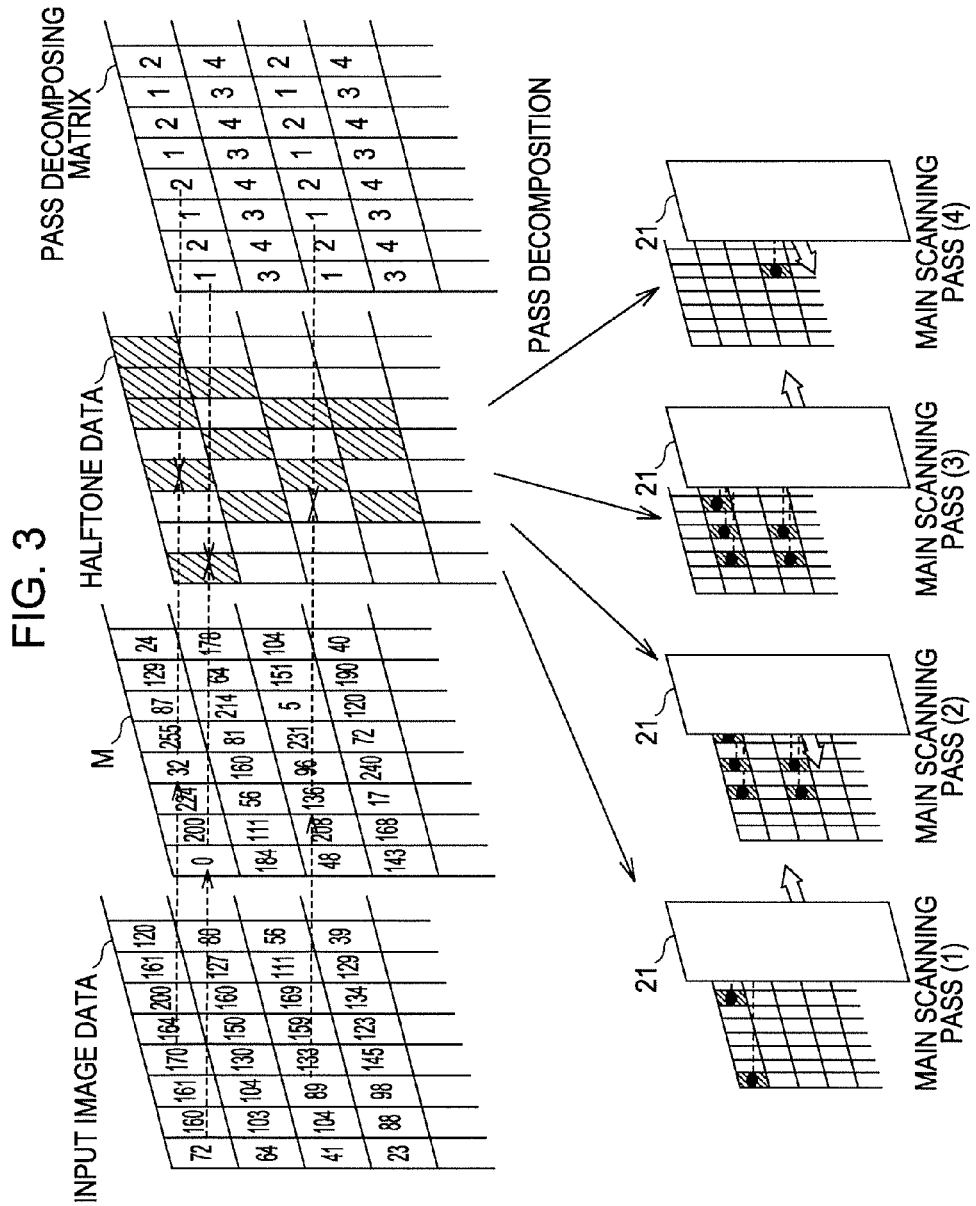
FIG. 3 is a diagram describing a halftone processing to a pass decomposing processing and a printing method.

FIG. 3 conceptually shows from the halftone processing to the pass decomposing processing and printing by the printer 20. In the halftone processing, it is determined whether it is possible to form dots for each pixel of input image data, while referring to the dither mask M. The size of each pixel corresponds to print resolution on a print sheet. For example, when the print resolution is width 1440×height 720 dpi, the size of the width and the height of each pixel is equivalent to width 1/1440 inches, and height 1/720 inches, respectively. When it is determined whether it is possible to form dots, first, a dot for the determination is selected, and then the grayscale value of an ink amount of an input image data for the pixel is compared to a threshold value accommodated in a mask pixel existing in a position corresponding to the pixel in the dither mask M. In addition, in the embodiment, a dither mask M is used and created in which the mask pixel is arrayed in 16 rows and 16 columns; a part of the dither mask M is shown in the drawing in order to simplify the drawing. The thin broken-line arrows in FIG. 3 schematically indicate the comparison of the grayscale value of the ink amount of the input image data and the threshold value accommodated in the mask pixel of the dither mask M, for each pixel. For example, since the grayscale value of the ink amount of the input image data is 72 and the threshold value of the dither mask M is 0 for the pixel in the left-top corner of the input image data, it is determined that a dot is formed in the pixel.

The solid-line arrows in FIG. 3 schematically indicate that it is determined to be possible to form a dot in the pixel and the determination result is reflected in the halftone data. On the other hand, a pixel adjacent to the right of the pixel has the grayscale value of the input image data, which is 160, and the threshold value of the dither mask, which is 200. Since the threshold value has a greater value, it is determined that a dot cannot be formed for the pixel. The halftone data is image data having binary information of whether a dot is formed in each pixel or not, pixels in which dots are formed are indicated by hatching in FIG. 3. In a dithering method, input image data is converted to halftone data indicating whether a dot is formed in each pixel or not, by determining whether a dot is formed in each pixel or not while referring to the dither mask M in that manner. As such, if the dithering method is used, the simple process of comparison between the grayscale value of input image data and threshold value set in the dither mask M makes it possible to determine whether a dot can be formed in each pixel or not.

If the halftone data can be generated in the above manner, the pass decomposing processing section P2d decomposes each pixel of the halftone data to each main scanning pass in the printer 20. FIG. 3 comparatively shows a pass decomposing matrix that stipulates decomposition rules in the pass decomposing process with the halftone data and the dither mask M. Each pixel of the pass decomposing matrix is correspondingly given with a main scanning pass number from 1 to 4. In the embodiment, four main scanning passes corresponding to the main scanning pass numbers from 1 to 4 constitute one cycle. Of course, the invention is not limited to a 4-pass printing, but can be applied to a case with another number of passes. In each cycle, each main scanning pass is performed in the ascending order of the pass numbers. As shown in FIG. 3, for pixels corresponding to the pass numbers 1 and 3, dots are formed in the main scanning passes where the print head 21 performs main scanning in the forward direction (the right direction in the drawing). For pixels corresponding to the pass numbers 2 and 4, dots are formed in the main scanning passes where the print head 21 performs main scanning in the rearward direction (the left direction in the drawing).

The dots formed in the main scanning passes of the pass numbers 1 and 3 are positioned deviated by $\frac{1}{1440}$ inches in the main scanning direction from the dots formed in the main scanning passes of the pass numbers 2 and 4. In addition, by adjusting an ink ejecting timing in each main scanning pass, a position for dot formation is deviated in the main scanning direction. Although not shown in the drawing, the amount of print sheets fed in the sub scanning direction between the main scanning passes of the pass numbers 1 and 2 and between the main scanning passes of the pass numbers 3 and 4 is an even-number times of $\frac{1}{720}$ inches (integer times of a nozzle pitch in the print head 21). On the other hand, the amount of the print sheet fed in the sub scanning direction between the main scanning passes of the pass numbers 2 and 3 and between the main scanning passes of the pass numbers 4 and 1 is an odd-number times of $\frac{1}{720}$ inches. Accordingly, the dots formed in the main scanning passes of the pass numbers 1 and 2 are positioned deviated by $\frac{1}{720}$ inches in the sub scanning direction from the dots formed in the main scanning passes of the pass numbers 3 and 4. When each pixel of the halftone data is decomposed in each main scanning pass, each pixel is re-arranged in the order of the main scanning passes, and output to the printer 20 with various control data attached thereto. Accordingly, the printer 20 consecutively performs the main scanning passes described above and forms a print image on a print sheet.

Incidentally, as shown in FIG. 3, the relationship between each mask pixel of the dither mask M and each pixel of the pass decomposing matrix can be specified. In other words, it is possible to specify each mask pixel of the dither mask M that determines which of the main scanning passes is used for the possibility of the dot formation. Based on the premise of the printing method described above, the dither mask M is generated as follows in the embodiment.

B. Generation of Dither Mask

Figure 4:
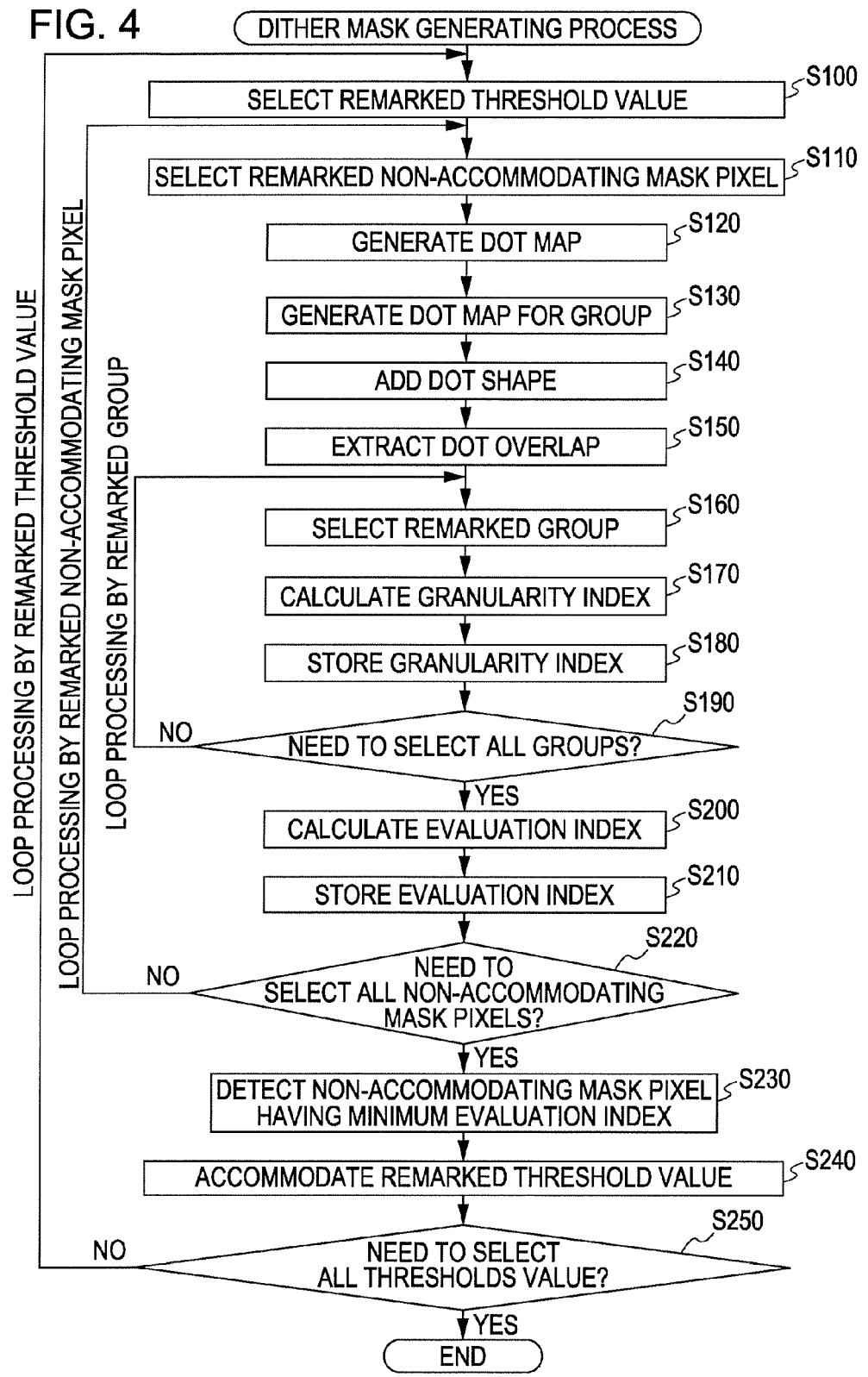
FIG. 4 is a flowchart illustrating dither mask generation processing.
Figure 5:
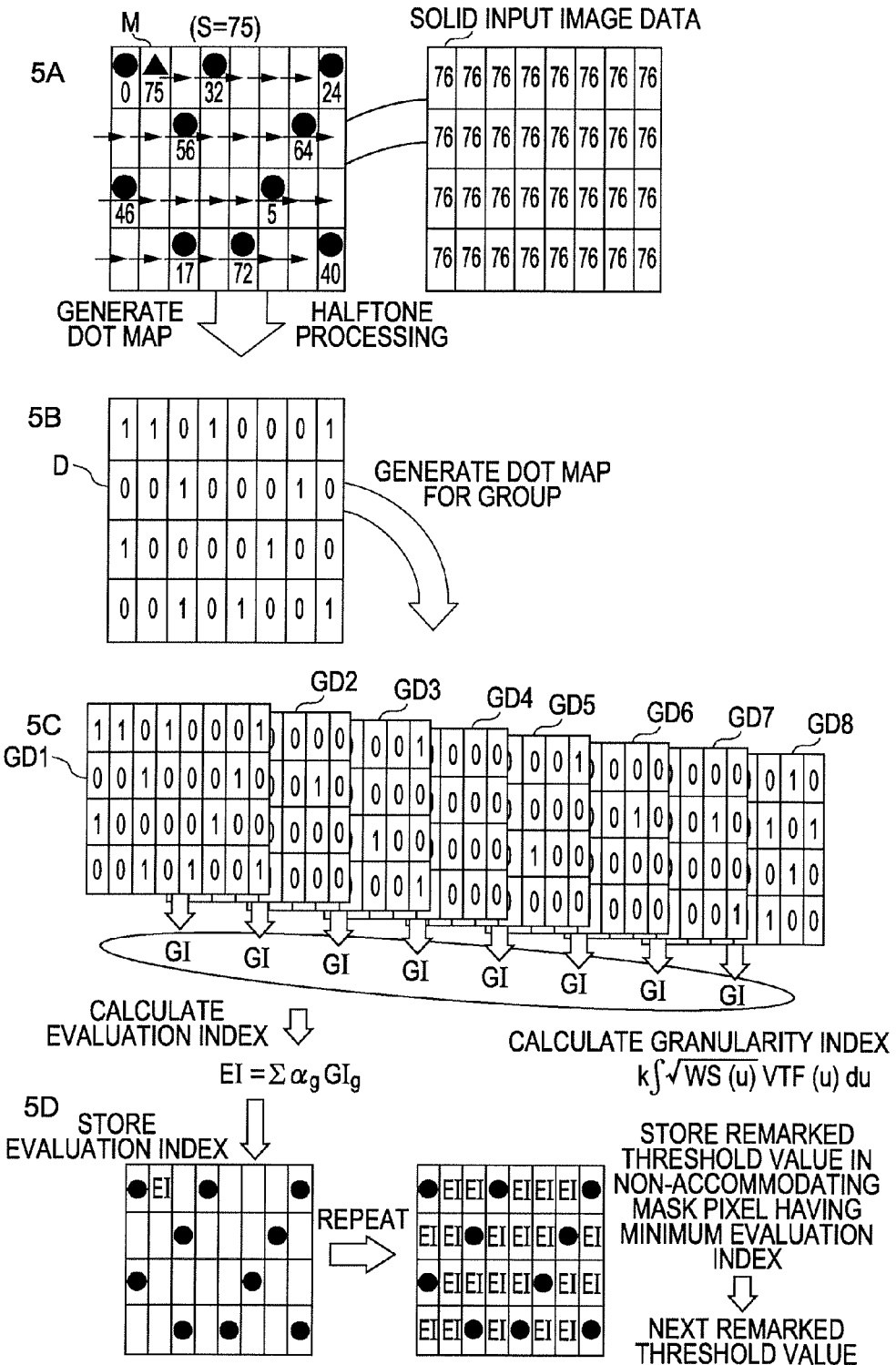
FIG. 5 is a diagram describing the dither mask generation processing.

FIG. 4 shows the flow of the dither mask generating process of the embodiment, and FIG. 5 conceptually shows the generation of the dither mask M by the dither mask generating process. The dither mask generating process is constituted by a plurality of loop processes, and, first, the outline of each loop process will be described. In the initial stage, nothing is accommodated in each mask pixel that forms the dither mask M. In addition, in the embodiment, the dither mask M with 16 row and 16 columns will be generated. Moreover, FIG. 5 is assumed to show only 4 rows and 8 columns in the left-top corner of the dither mask M in order to simplify the drawing (the same is applied to FIG. 6, FIG. 7, and FIG. 13). The grayscale value of the ink amount of each pixel in the input image data after a color converting process is assumed to be in the range of 0 to 255 (8-bit). Of course, the size of the dither mask M is not limited to 16 rows and 16 columns, and the dither mask M with a size appropriate for accommodating a threshold value of about, for example, 10-bit may be generated.

The threshold values from 0 to 255 are assumed to be accommodated in order from a lower value without repetition in each mask pixel. In Step S100, a process of selecting threshold values in order from a lower value is performed (hereinafter, a selected threshold value is referred to as a remarked threshold value S), and a process of determining a mask pixel for accommodating the remarked threshold value S is repetitively performed in the loop process from Step S100 to Step S250. As shown in FIG. 5A, in the stage where a remarked threshold value S is selected, a threshold value smaller than the remarked threshold value S (hereinafter, referred to as an accommodated threshold value) has already been accommodated in any mask pixel (hereinafter, referred to as an accommodating mask pixel (indicated by ● in the drawings)). In the mask pixels of the dither mask M, a pixel other than the accommodating mask pixel is referred to as a non-accommodating mask pixel.

In Step S110, a process of selecting non-accommodating mask pixel is performed (hereinafter, the selected non-accommodating mask pixel is referred to as a remarked non-accommodating mask pixel (indicated by ▲ in the drawing)). A process of calculating an evaluation index for evaluating the dot dispersibility in a case where the remarked threshold value S (S=75 in the drawing) is accommodated in the remarked non-accommodating mask pixel is repetitively performed in the loop process from Step S110 to Step S220. Here, a dot map D is obtained where dots are formed in the accommodating mask pixels (indicated by ● in the drawings) and the remarked non-accommodating mask pixel (indicated by ▲ in the drawing). When the dot map D is generated as shown in FIG. 5B, each of the mask pixels in the dot map D are classified into a plurality of groups as shown in FIG. 5C, and thereby a dot map for each group GD that corresponds to each group is generated. In Step S160, a process of selecting a group is performed (hereinafter, the selected group is referred to as a remarked group). A process of calculating a granularity index GI (which is an index for each group in the invention) of the dot map for each group GD that corresponds to the remarked group is repetitively performed in the loop process from Step S160 to Step S190. When the granularity index GI is calculated for all the groups, an evaluation index EI is calculated by linearly combining the granularity indexes GI of the groups with each other.

As shown in FIG. 5D, since the calculation of the evaluation index EI is repeated until the non-accommodating mask pixels are selected as all the remarked non-accommodating mask pixels, the evaluation index EI is calculated for all the non-accommodating mask pixels. In addition, a non-accommodating mask pixel with the minimum evaluation index EI is detected, and the remarked threshold value S is accommodated in the non-accommodating mask pixel. The remarked threshold value S is renewed in the dither mask M for new accommodation, and the same process is repeated for the next remarked threshold value S. By the loop processes described above, the remarked threshold value S can be accommodated in the ascending order. Hereinbelow, detailed processes for each step will be described in order.

In Step S100, the remarked threshold value selecting section P1b performs a remarked threshold value selecting process. The remarked threshold value selecting process is a process to select a threshold value to be accommodated in any one of the mask pixels. In the embodiment, a threshold value is determined by selecting a threshold value having a relatively small value, in other words, a threshold value having a value for easier dot formation in order. In the embodiment, the dither mask M has an arrangement of 16 rows and 16 columns, and accommodates threshold values that do not overlap with each other for 256 (=16×16) mask pixels. In addition, the remarked threshold value S increases one by one in the range of 0 to 255.

In Step S110, the evaluation index calculating section P1c selects a remarked non-accommodating mask pixel from non-accommodating mask pixels of the current dither mask M. For example, as indicated by the arrows in FIG. 5A, it may be possible to select a pixel from the non-accommodating mask pixels positioned in the top-left of the dither mask M in order. In Step S120, the dot map generating portion P1c1 obtains a dot map D with which dots are formed in the accommodating mask pixels (indicated by ● in the drawings) and the non-accommodating mask pixel (indicated by ▲ in the drawing). As shown in FIGS. 5A and 5B, the dot map D conceptually corresponds to halftone data in a way that solid input image data where all pixels have grayscale values of ink amounts resulting from addition of 1 to the remarked threshold value S are subject to a halftone process, by using the dither mask M in which the remarked threshold value S is assumed to be arranged in the remarked non-accommodating mask pixels. The dot map D has the same size as that of the dither mask M, is formed of the same number of mask pixels as the dither mask M, and a grayscale value of "1" is given to a position where a dot is formed. In the next Steps S130 to S150, the group classifying section P1a generates dot maps for groups GD corresponding to a plurality of the groups based on the dot map D obtained in Step S120.

Figure 6:
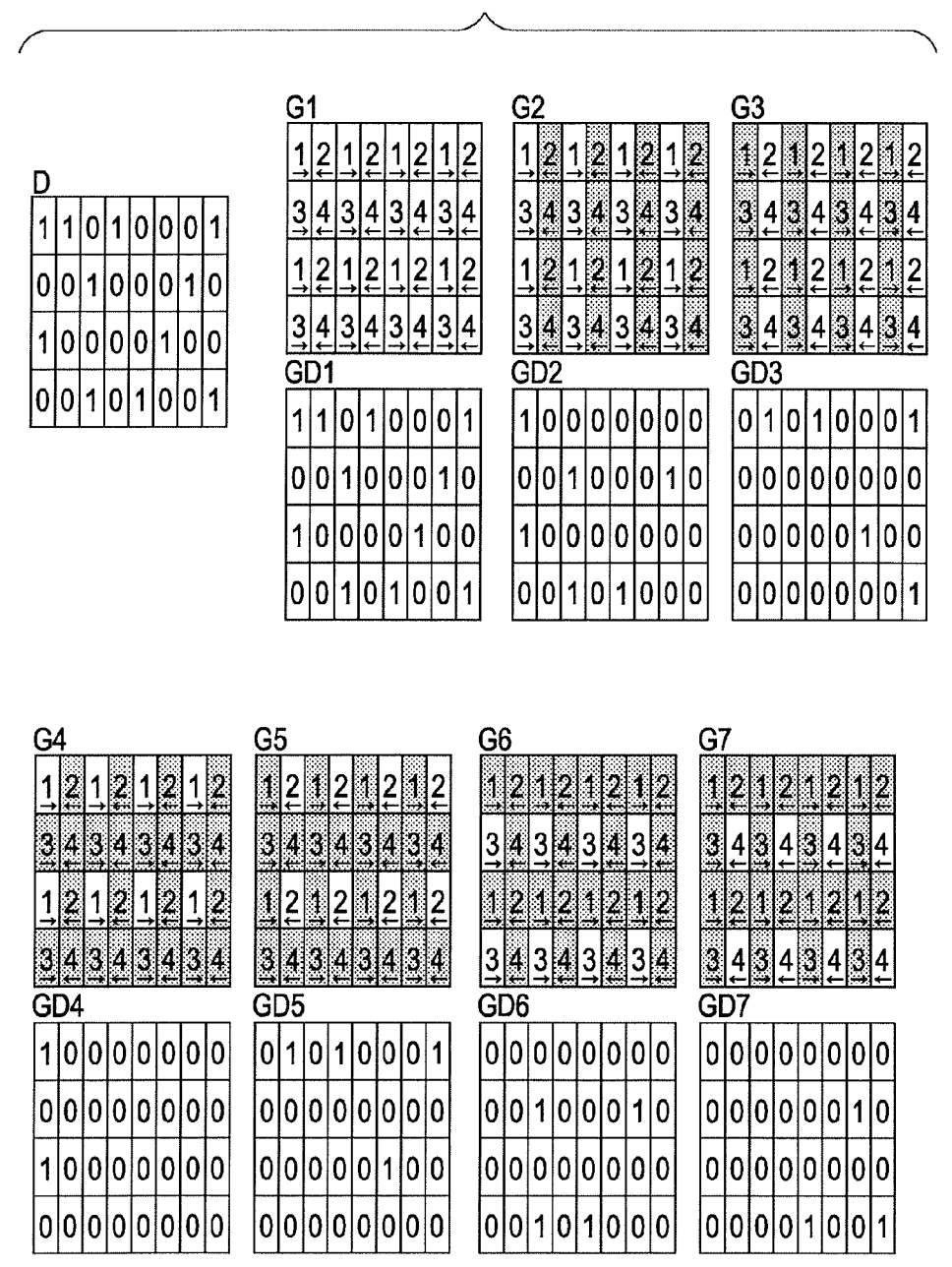

FIG. 6 shows the generation of the dot maps for groups GD based on the dot map D in Step S130. In the embodiment, the dot maps for groups GD1 to GD7 are generated for seven groups from G1 to G7 by classifying each mask pixel of the dot map D based on the pass numbers of the main scanning passes defined in the pass decomposing matrix described above. As for the group G1, all the mask pixels in the dot map D are treated as valid without substantial changes. The group G1 is equivalent to all mask pixel groups of the invention. A dot map for group GD2 of the group G2 has only dots for mask pixels corresponding to the pass number 1 and pass number 3 as valid among mask pixels of the dot map D. In other words, the grayscale values of mask pixels other than the mask pixels corresponding to the pass number 1 and pass number 3 are uniformly "0". As for other groups from G3 to G7, the grayscale values for mask pixels other than the mask pixels having valid dots are also uniformly "0". FIG. 6 shows the pass decomposing matrix, and arrows indicating the main scanning direction below the pass numbers given in each pixel. FIG. 6 shows the pass decomposing matrix corresponding to each group from G1 to G7, and expresses areas to be invalid when the dot maps for groups from GD1 to GD7 are generated with halftone dot-meshing.

The dot map for group GD3 for the group G3 has only dots for mask pixels corresponding to the pass number 2 and the pass number 4 as valid among the mask pixels of the dot map D. The group G2 is formed of mask pixels that have the forward direction as the scanning direction of the corresponding main scanning pass, and the group G3 has valid dots for mask pixels that have the rearward direction as the scanning direction of the corresponding main scanning pass. The groups G2 and G3 correspond to the same scanning groups of the invention.

The dot map for group GD4 for the group G4 has only dots for mask pixels corresponding to the pass number 1 as valid, the dot map for group GD5 for the group G5 has only dots for mask pixels corresponding to the pass number 2 as valid, the dot map for group GD6 for the group G6 has only dots for mask pixels corresponding to the pass number 3 as valid, and the dot map for group GD7 for the group G7 has only dots for mask pixels corresponding to the pass number 4 as valid. The groups G4 to G7 correspond to the same scanning groups of the invention.

In Steps S140 and S150, a process of generating a dot map for group GD8 for a group G8 is performed. First, in Step S140, the dot shape adding portion P1c2 performs a process of adding the shape of a dot to the dot map for group GD1 that includes all components of main scanning passes.

FIG. 7 shows the addition of the dot shape to the dot map for group GD1. In the embodiment, a dot shape (the shape surrounded by a broken line in FIG. 7A) is added which expands by one mask pixel in left, right, top, and bottom of a mask pixel that is added with a grayscale value "1" in the dot map for group GD1. Here, a mask pixel that expands by a dot shape is added with the grayscale value "1". In the embodiment, it is assumed to be a vertically long circle of dot shape as indicated by a solid line. When a plurality of mask pixels added with the grayscale value "1" in the dot map for group GD1 are adjacent to the left, right, top, and bottom of a pixel and exist with a space of one pixel in the left, right, top, and bottom of a pixel, a dot overlap is generated. For a mask pixel where dots overlap, another grayscale value "1" is added to the previous grayscale value "1". Accordingly, as shown in FIG. 7B, the grayscale value of a mask pixel where dots overlap has a value of "2" or more.

In Step S150, by extracting mask pixels having the grayscale values of "2" or more (only the mask pixels having the grayscale value "2" or more are given with the grayscale value "1", and other mask pixels are given with the grayscale value "0") as shown in FIG. 7B, the dot map for group GD8 is generated as shown in FIG. 7C. It can be said that the occurrence of a dot overlap and the dot map for group GD8 and the spatial distribution are predicted in the dot map for group GD8. In that manner as above, when the dot maps for groups GD1 to GD8 are generated, the group classifying section P1a selects a remarked group in the next Step S160. In Step S170, the dispersibility index calculating portion P1c3 calculates the granularity index GI for the dot maps for groups GD1 to GD8 of the remarked groups based on the following Equation (1) given below. The granularity index GI corresponds to the dot dispersibility of the invention.

Expression 1

$$GI = k \int \sqrt{WS(u)} VTF(u) du \quad (1)$$

For the granularity index GI, for example, Image Quality Evaluation of Inkjet Prints written by Makoto Fujino, Japan Hardcopy '99, p. 291-294 can be referred to. In the Equation 1 above, k is a correction coefficient, WS(u) is Wiener spectrum for an image, VTF is a spatial frequency characteristic for vision, and u is a spatial frequency. The spatial size of each mask pixel is 1/1440 inches in width and 1/720 inches for height based on the print resolution.

In the Equation (1), the granularity index GI obtains a power spectrum of a space wave for the grayscale value of the mask pixels existing in the dot maps for groups GD1 to GD8 by performing Fourier transform for an image plane shown by the dot maps for groups GD1 to GD8, and then is calculated by convolving the spatial frequency characteristic for vision VTF in the power spectrum. In addition, the VTF is set with general values of an angle of view or an observation distance when a printed product is observed. It can be said that the granularity index GI is an accumulated value for all spatial frequencies taking into consideration the weight of the size of a space wave for the grayscale values existing in the dot maps for groups GD1 to GD8 given by the spatial frequency characteristic for vision VTF. In addition, the granularity index GI indicates an unfavorable print result if the result takes a positive value, and as the value gets greater, the sense of granularity feels rougher.

In Step S180, the RAM 12 stores the calculated granularity index GI. In Step S190, the group classifying section P1a determines whether all of the groups G1 to G8 are to be selected remarked groups, and when all of the groups are not selected, the process returns to Step S160, and then the next remarked group is selected. By repeating the process described above, the granularity index GI of the groups G1 to G8 can be obtained for the current remarked non-accommodating mask pixels. In Step S200, the evaluation index calculating section P1c calculates the evaluation index EI based on Equation (2) given below.

Expression 2

$$EI = \Sigma \alpha_g GI_g \qquad (2)$$

As shown in the Equation (2), the evaluation index EI is obtained by linear combination of the granularity index GI of the groups G1 to G8 (wherein, the subscript g (g=1 to 8) indicates an identification number for a group). Upon the combination, the granularity index GI is weighted by a non-negative weight coefficient $\alpha$ that is individually set for each of the groups G1 to G8. In other words, the degree of weight for each of the groups G1 to G8 when the evaluation index EI is obtained is adjusted by the weight coefficient $\alpha$. The degree of weight for each of the groups G1 to G8 is set according to a hardware characteristic of the printer 20, a characteristic of ink, or a print mode (print speed and print resolution). For example, when it is assumed to use ink excellent in a fixing property on a print sheet, it can be considered that the weight of the group G1 that evaluates the granularity of a print result is greater than that of the groups G2 to G8 that evaluate a dot formation process. In that manner as above, if the evaluation index EI is obtained for the current remarked non-accommodating mask pixels, the obtained evaluation index EI is stored in the RAM 12 in Step S210. In Step S220, it is determined whether all the non-accommodating mask pixels are to be selected as remarked non-accommodating mask pixels or not, and when all of the pixels are not selected, the next non-accommodating mask pixel is selected in Step S110. Accordingly, while the remarked non-accommodating mask pixels are sequentially shifted, it is possible to calculate the evaluation index EI for each of the non-accommodating mask pixels.

FIG. 5D schematically shows the sequential storing of the evaluation index EI in the RAM 12. As shown in the drawing, in the current dither mask M, the evaluation index EI is sequentially stored for non-accommodating mask pixels other than accommodating mask pixels (indicated by ● in the drawings), and finally, all of the non-accommodating mask pixels are filled with the evaluation index EI. In Step S230, the threshold value accommodating section P1d detects a non-accommodating mask pixel having the minimum evaluation index EI. In addition, the threshold value accommodating section P1d accommodates the current remarked threshold value S for the detected non-accommodating mask pixel (Step S240). In Step S250, the remarked threshold value selecting section P1b determined whether all threshold values are to be selected as the remarked threshold value S or not (whether the current remarked threshold value S is 255 or not), and when all of the values are not selected, the process returns to Step S100. Accordingly, in the dither mask M, it is possible to accommodate the remarked threshold values S in the ascending order. On the other hand, when the process is completed for the final remarked threshold value S (255), the process of generating the dither mask M ends.

According to the dither mask M generated in the manner as above, it is possible to obtain a print result with excellent image quality. Hereinbelow, the reason will be explained. First, since the remarked threshold value S is accommodated in the non-accommodating mask pixel having the minimum evaluation index EI, a print result that is difficult to feel the granularity can be obtained. In addition, as a mask pixel gets smaller threshold value to be accommodated, a probability that dots are formed in corresponding positions gets higher. In the embodiment, by accommodating the threshold values in the ascending order, mask pixels that have high probability of forming dots can be preferentially dispersed. Accordingly, it is possible to secure the dispersibility of dots when unspecific input image data are printed.

Furthermore, since the granularity index GI is calculated for the same scanning groups (groups G4 to G7) and added to the evaluation index EI, it is possible to secure the dispersibility of dots formed in each of the main scanning passes. In other words, since dots that are almost simultaneously formed are dispersed in a space, causes of deteriorating the image quality such as ink clumps, uneven luster, the bronze phenomenon, or the like can be suppressed. Since the granularity index GI is calculated for the same scanning groups (groups G2 and G3) and added to the evaluation index EI, it is possible to secure the dispersibility of dots formed in each of the main scanning directions. Accordingly, it is possible to prevent locally biased distribution of the dots formed in each of the main scanning directions, and to suppress uneven colors or the lie when ink drops are deviated from a landing position among the main scanning directions, or the like.

Since the granularity index GI for the dot map for group GD8, from which mask pixels with dot overlap are extracted when the dot shapes are considered, is also added to the evaluation index EI, it is possible to the mask pixels with dot overlap. It is possible to prevent the dot overlap from locally concentrating in a printed image, and to prevent ink blots, uneven density, uneven colors, and uneven luster. As such, in the embodiment, since the granularity index GI for each of the groups GI to G8 is considered, it is possible to prepare a dither mask M that makes it possible to have printing with high image quality. Furthermore, in Step S150 of the embodiment, the dot map for group GD8 is generated by uniformly giving the grayscale value "1" to the mask pixels with the grayscale value "2" or more, but it may be possible to use mask pixels with dot overlap having the grayscale value "2" or more. In that manner as above, it is possible to make the amplitude of a space wave greater as the number of dot overlaps gets greater, and to reduce the number of dot overlaps.

C. Modified Examples

Hereinabove, the embodiment of the invention has been described, but the invention is not limited thereto, and can be modified in various forms within the scope not departing from the gist of the invention. For example, the invention can be a halftone process for the modified examples shown below. In the embodiment described above, the dot overlap is dispersed in the dithering method, but can be dispersed in an error diffusion method.

C-1. Modified Example 1

Figure 8:
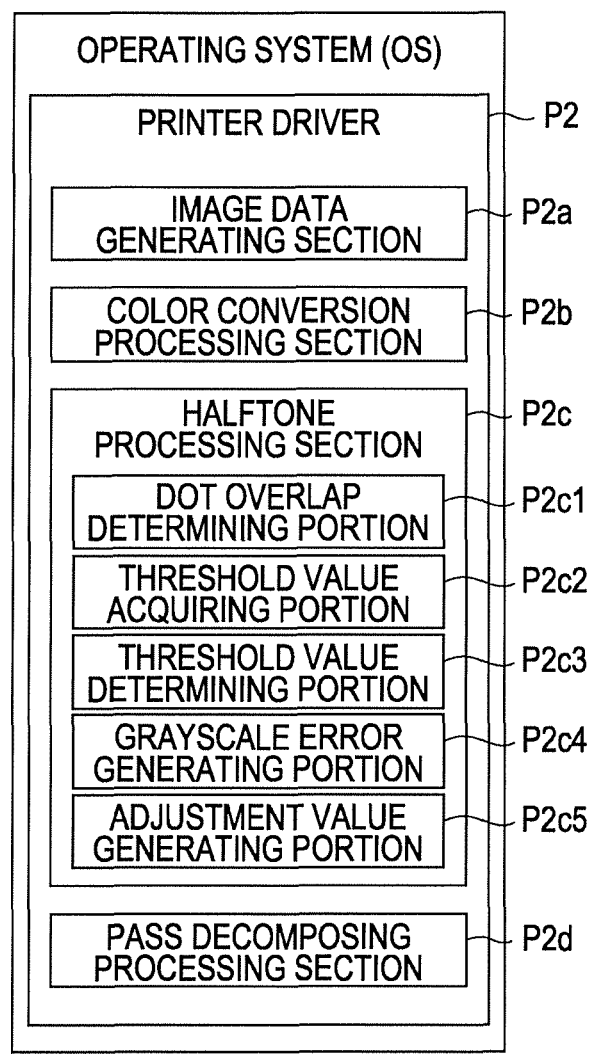
FIG. 8 is a composition diagram of software of a computer according to a modified example.
Figure 9:
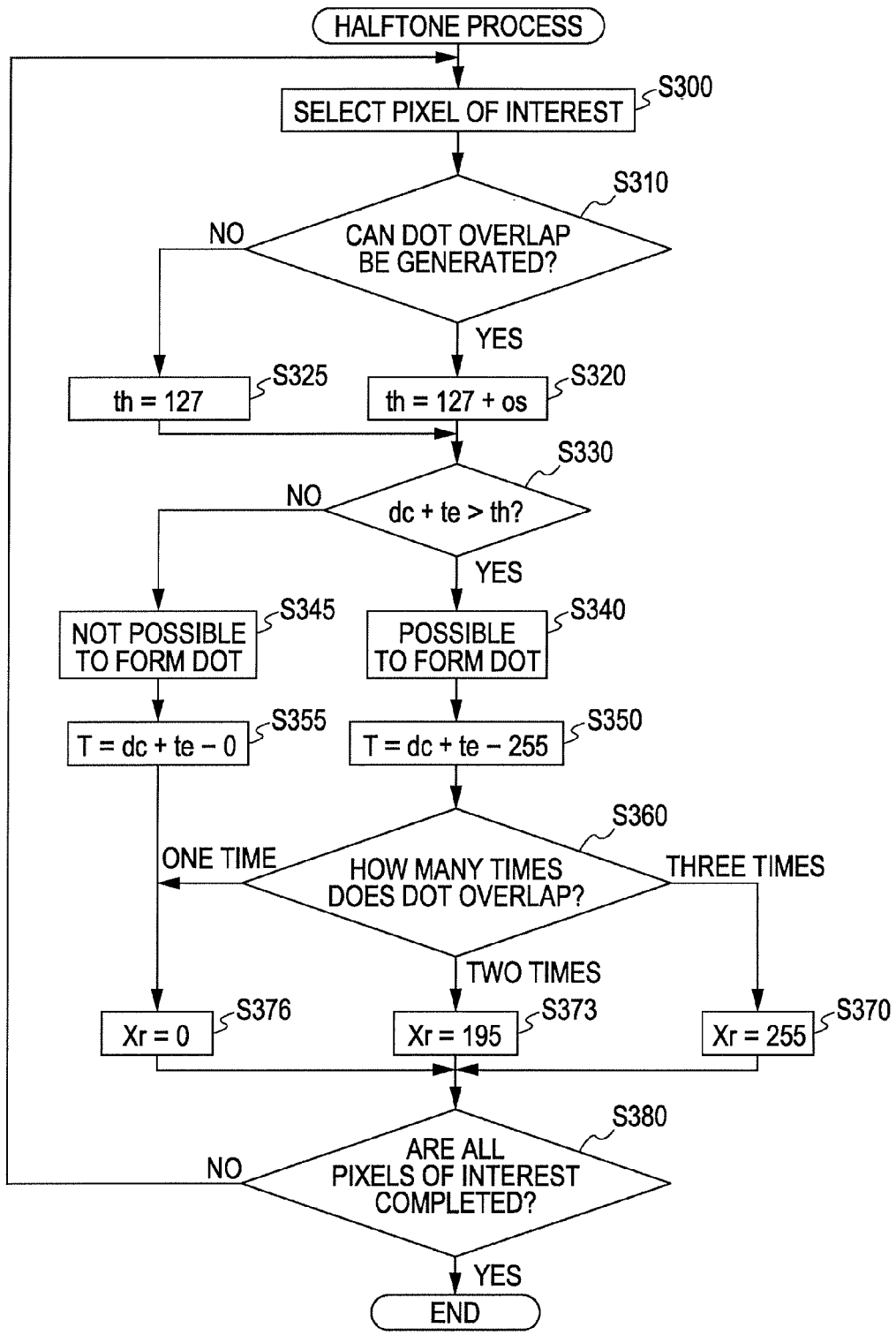
FIG. 9 is a flowchart describing the flow of halftone processing according to the modified example.
Figure 10:
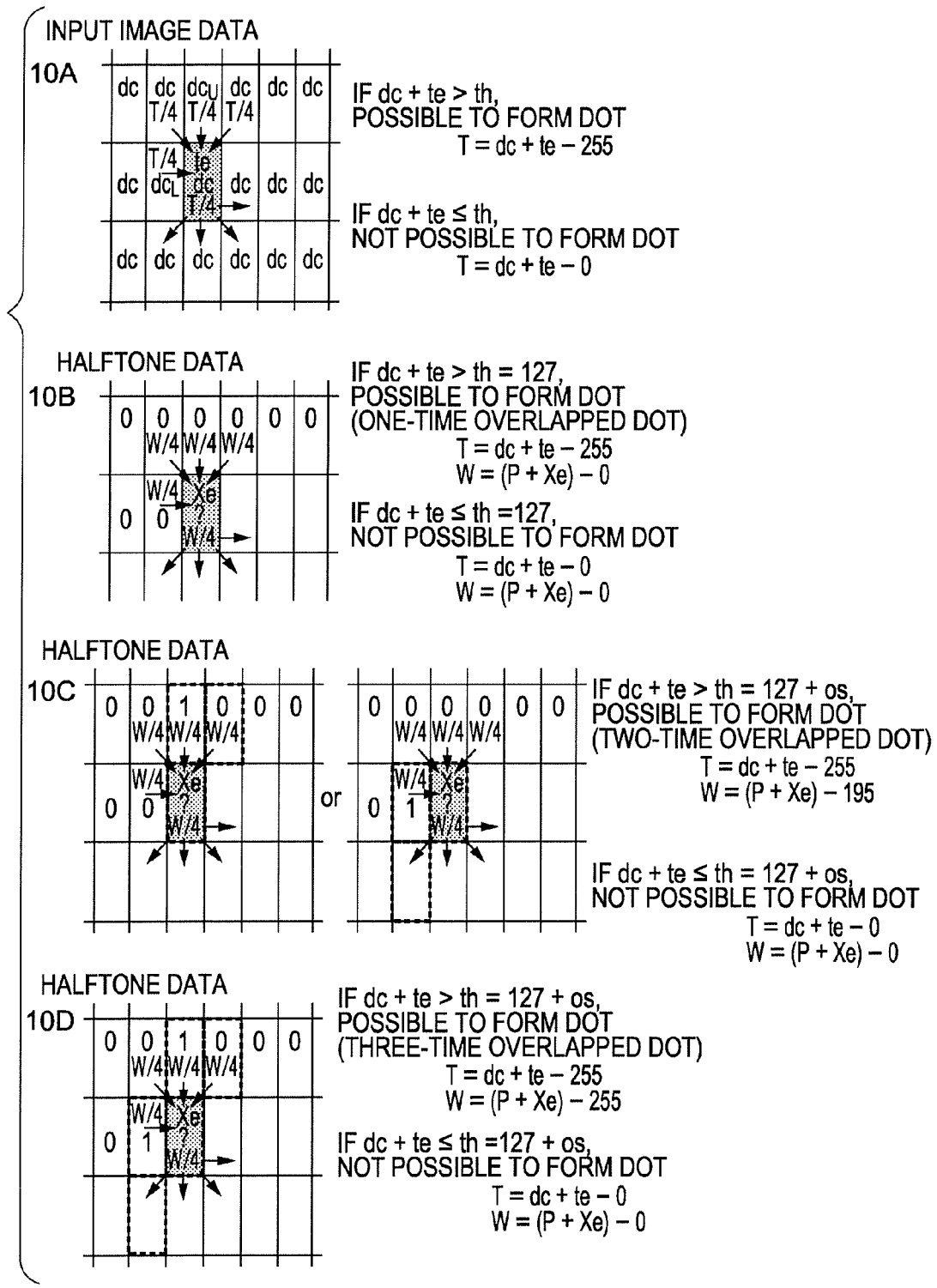
FIG. 10 is a diagram describing the flow of halftone processing according to the modified example.

FIG. 8 shows a composition of software executed by the computer 10 for a halftone process of the modified example, and FIG. 9 and FIG. 10 show the flowchart and schematic diagrams describing the flow of the halftone process of the modified embodiment. In the modified example as shown in FIG. 8, the printer driver P2 is executed in the computer 10 in the same manner as in the embodiment above, but the composition of the halftone processing section P2c in the printer driver P2 is different. In other words, the halftone processing section P2c of the modified example includes a dot overlap determining portion P2c1, a threshold value acquiring portion P2c2, a threshold value determining portion P2c3, a grayscale error generating portion P2c4, and an adjustment value generating portion P2c5. The printer 20 in the modified example can eject C (cyan), M (magenta), Y (yellow), and K (black) ink, and FIG. 9 and FIGS. 10A to 10D shows that the halftone processing section performs a halftone process for C ink among the inks in the error diffusion method. Each pixel of the input image data has the ink amount of C ink (hereinafter, referred to as dc). Although not shown in the drawing, the grayscale values of ink amounts for other M, Y, and K inks are obtained by a color conversion process, and the same halftone process is performed for the inks.

FIG. 10A shows a basic flow of the error diffusion process. First, in Step S300, a pixel of interest (indicated by halftone dot-meshing in the drawing) is selected. In the modified example, the pixel of interest is selected such that the pixel of interest is shifted in the forward direction of the main scanning (the right direction in the drawing), and if the pixel of interest arrives at the end, pixels in one row below are selected in order. In Step S330, the threshold value determining portion P2c3 determines whether the sum of the grayscale value dc of the ink amount of the pixel of interest and an accumulated grayscale error for the pixel of interest (hereinafter, referred to as te) is greater than a threshold value th or not. In addition, if the sum of the grayscale value dc and the accumulated grayscale error te is greater than the threshold value th, dots are formed in the pixel of interest (Step S340), and if the sum is smaller than the threshold value th, the dots are not formed in the pixel of interest (Step S345). When the dots are formed in the pixel of interest, the grayscale error generating portion P2c4 diffuses a diffusion value obtained by dividing a grayscale error T, which is obtained by subtracting 255 from the sum of the grayscale value dc of the ink amount of the pixel of interest and the accumulated grayscale error te, by 4 in peripheral pixels adjacent in the lower left, immediate lower, lower right and right (Step S350). When the dots are not formed in the pixel of interest, the grayscale error generating portion P2c4 diffuses a diffusion value obtained by dividing a grayscale error T, which is obtained by subtracting 0 from the sum of the grayscale value dc of the ink amount of the pixel of interest and the accumulated grayscale error te, by 4 in peripheral pixels adjacent in the lower left, lower right, lower right and right (Step S355). The accumulated grayscale error te is that the diffusion value of the grayscale error T generated when pixels in the upper left, immediate upper, upper right, and left of the pixel of interest are focused. The above process is repeated to the final pixel of interest, and when it is determined that all the pixels in the input image data have selected as pixels of interest finally in Step S380, the halftone process by the error diffusion method is completed. Next, the characteristics of the process in the modified example will be described.

In Step S310, when the dot overlap determining portion P2c1 determines that the pixel of interest shown in FIGS. 10C and 10D are in a position where the dot overlap can be made, the threshold value acquiring portion P2c2 acquires a threshold value by adjusting the threshold value th to a value obtained by adding an offset amount os to 127 (127+os) (Step S320). On the other hand, when the pixel of interest is not in a position for the dot overlap as shown in FIG. 10B, the threshold value acquiring portion P2c2 acquires 127 as the threshold value th as the principle (Step S325). In Step S310, when the dot overlap determining portion P2c1 determines whether the pixel of interest is in the position where the dot overlap can be made or not, it is assumed to have the dot shape indicated by the broken line in FIGS. 10C and 10D in the modified example. In other words, the dot shape is assumed to expand by one pixel in the right and below the center pixel. Accordingly, when dots are formed in peripheral pixels adjacent to any part of the above or left of the pixel of interest as shown in FIG. 10C, the dots overlaps double by being formed in the pixel of interest. In addition, when dots are formed in peripheral pixels adjacent to both parts of the above and left of the pixel of interest as shown in FIG. 10D, the dots overlap triply by being formed in the pixel of interest. The offset amount os is defined based on Equation (3) given below.

Expression 3

$$os = -1 \times (P+Xe) \times K \quad (3)$$

In Equation (3) above, P indicates a set value for setting the easiness of generating a dot overlap in the pixel of interest, Xe indicates an accumulative adjustment value for the pixel of interest, and K indicates a weight coefficient. The set value P is given by, for example, Equation (4) below.

Expression 4

$$P = PW \times 255 + PU \times 195 + PL \times 195 \quad (4)$$

$$PW = (dc_U/255)(dc_L/255)(dc/255)$$

$$PU = (dc_U/255)(dc/255) - PW$$

$$PL = (dc_L/255)(dc/255) - PW$$

In Equation (4) above, dc indicates a grayscale value of the ink amount of the pixel of interest, $dc_U$ indicates a grayscale value of the ink amount of a pixel immediate upper the pixel of interest, and $dc_L$ indicates a grayscale value of the ink amount of a pixel in the left of the pixel of interest. In Equation (4) above, PW indicates a probability that dots are overlap triply when a halftone process is performed at outright random for the pixel of interest having the grayscale value dc of the ink amount (a probability that dots are formed in both the pixel of interest and peripheral pixels adjacent to the above and left of the pixel of interest). PU and PL indicate a probability that dot overlap double when the halftone process is performed at outright random for the pixel of interest (a probability that dots are formed in either the pixel of interest or peripheral pixels adjacent to the above and left of the pixel of interest). The set value P has a larger value as the grayscale value dc of the ink amount of the pixel of interest gets greater, as shown in Equation (4) above. Furthermore, according to Equation (3) above, as the grayscale value dc of the ink amount of the pixel of interest gets greater, the offset amount os gets smaller, and the threshold value th is offset by a smaller value. In other words, as the grayscale value dc of the ink amount of the pixel of interest gets greater, the offset amount os acts so that the dot overlap easily occurs.

As shown in FIGS. 10B to 10D, the accumulative adjustment value Xe is obtained by accumulating a diffusion value obtained by dividing the adjustment value W, which is generated when the peripheral pixels adjacent to the upper left, immediate upper, upper right, and left of the pixel of interest are focused, by 4. An adjustment value generating portion P2c5 calculates the adjustment value W based on Equation (5) given below.

Expression 5

$$W=(P+Xe)-Xr \quad (5)$$

In Equation (5) above, Xr indicates an occurrence value. The occurrence value Xr is set to different values according to the occurrence state of a dot overlap. The dot overlap determining portion P2c 1 determines what kind of state the dot overlap is in, based on the fact that dots are formed in the pixel of interest (Step S360). Here, when the dots are formed in double-overlapping manner in the pixel of interest as shown in FIG. 10C, the occurrence value Xr is 195 (Step S373), when the dots are formed in triple-overlapping manner as shown in FIG. 10D, the occurrence value Xr is 255 (Step S370), and in other cases (cases where dots are not formed and where dots are formed not in an overlapping manner), the value is 0 (Step S376).

Accordingly, when dots are newly formed in an overlapping manner in the pixel of interest, the adjustment value W has a smaller value, and in other cases, the adjustment value W tends to have a relatively greater value. A value obtained by dividing the adjustment value W by 4 is diffused in peripheral pixels adjacent to the lower left, immediate lower, lower right and right of the pixel of interest, and the accumulative adjustment value Xe for the pixels is reflected thereto. According to Equation (3) above, as the accumulative adjustment value Xe gets smaller, the threshold value th is offset by a greater value, and the values act so that it is difficult to generate dot overlaps. In other words, when dots are formed in an overlapping manner in the pixel of interest, it is possible to suppress the dots are formed in an overlapping manner in the peripheral pixels adjacent to the lower left, immediate lower, lower right and right of the pixel of interest.

Furthermore, as shown by Equation (5) above, since the accumulative adjustment value Xe reduces a contribution rate and contributes to the adjustment value W of adjacent pixels in order, it is possible to make it difficult to generate dot overlaps not only in pixels directly adjacent to the pixel in which the dot overlap is generated, but also pixels separated by a few pixels from the pixel in which the dot overlap is generated. Accordingly, it is possible to prevent the pixel in which the dot overlap is generated from concentrating regionally, and to disperse the pixel in which the dot overlap is generated overall. Particularly, in cases where the dots overlap triply and the dots overlap double, since the former case has a greater occurrence value Xr, it is possible to strongly suppress the occurrence of pixels with dot overlap in the next time in the former case. However, in the cases where the dots overlap triply and the dots overlap double, the occurrence value Xr is not necessary to have different values, and the both cases can have the same occurrence value Xr. In addition, the adjustment value W is dispersed in four peripheral pixels, but the value may be dispersed in more and further pixels. Moreover, the weight coefficient K is a coefficient that adjusts the range of fluctuation of the offset amount os, and for example, the offset amount os is set to be adjusted to a few % to dozens % in the whole. It is preferable to make the weight coefficient K as greater as fidelity of a printed image to the input image data is obvious. As described above, according to the modified example, the dot shape can be predicted by the error diffusion process, and the dot overlap can be dispersed spatially. Moreover, the offset amount os corresponds to the evaluation index of the invention.

C-2. Modified Example 2

Hereinabove, an embodiment and a modified example have been shown in which the dot overlap generated when the dots are formed after ink drops land on ideal position is predicted, but the dot overlap generated when the dots are formed after ink drops do not land on ideal position may be dispersed.

Figure 11:
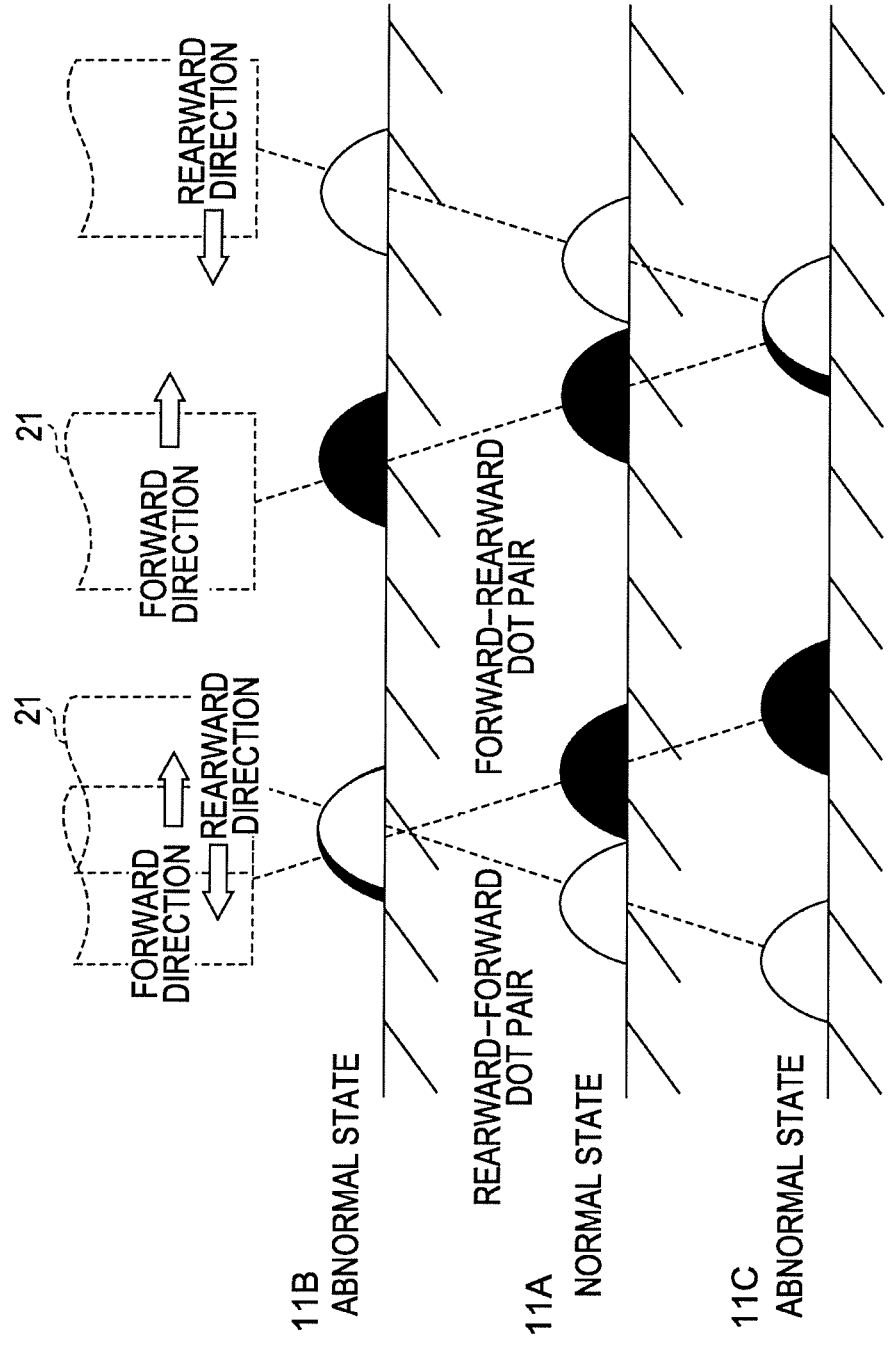
FIG. 11 is a diagram describing deviation in scanning directions.

In FIG. 11, the landing position deviation (which corresponds to position deviation between main scanning direction in the invention) of ink drops is schematically described. FIG. 11A shows a normal state of a print sheet, and FIGS. 11B and 11C shows abnormal states of the print sheet. In the example of FIG. 11B, printing is performed in a state that the print sheet is positioned closer to the print head 21 than in the normal position. In such state, if the print head 21 ejects ink drops while performing main scanning in the forward direction, dots (indicated by black in the drawing) are formed in a position deviated to the rearward direction than the original landing position. In addition, if the print head 21 ejects ink drops while performing the main scanning in the rearward direction, dots (indicated by white in the drawing) are formed in a position deviated to the forward direction than the original landing position. Accordingly, the positional relationship between the dots formed by the main scanning pass in the forward direction and the dots formed by the main scanning pass in the rearward direction changes and an intended printed image is not able to be formed. For example, in a dot pair (hereinafter, referred to as a rearward-forward dot pair) in which the dots formed by the main scanning in the rearward direction adjacent to the dots formed by the main scanning pass in the forward direction from the rearward direction side (the left side in the drawing), the dots are closer to each other than in the normal case. When the dots in the rearward-forward dot pair are close to and overlap with each other, the covered area by the dots gets narrower. On the contrary, in a dot pair (hereinafter, referred to as a forward-rearward dot pair) in which the dots formed by the main scanning in the rearward direction adjacent to the dots formed by the main scanning pass in the forward direction from the forward direction side (the right side in the drawing), the dots are estranged from each other than in the normal case.

On the other hand, in the example of FIG. 11c, printing is performed in a state that the print sheet is positioned far from the print head 21 than in the normal position. In this case, contrary to the example of FIG. 11B, the dots in the rearward-forward dot pair are estranged from each other different from the normal case, and the dots in the forward-rearward dot pair are close to each other different from the normal case. When the dots in the forward-rearward dot pair are close to and overlap with each other, the covered area by the dots gets narrower. In order to suppress changes in the covered area by the dots, it is preferable that the number of rearward-forward dot pairs is reduced in the case of FIG. 11B and the number of forward-rearward dot pairs is reduced in the case of FIG. 11C. However, if the number of rearward-forward dot pairs is reduced only in consideration of the state of FIG. 11B, the forward-rearward dot pairs increase to complement the reduced rearward-forward dot pairs, and remarkable changes in the covered area occur in the state of FIG. 11C. In the same manner, if the number of forward-rearward dot pairs is reduced only in consideration of the state of FIG. 11C, remarkable changes in the covered area occur in the state of FIG. 11B. Therefore, it is preferable to have the same number of rearward-forward dot pairs and forward-rearward dot pairs when it is considered that both the states of FIG. 11B and FIG. 11C can occur.

In addition, if the rearward-forward dot pairs exist in a regionally concentrating manner, the changes in the covered area in the state of FIG. 11B are obvious as uneven density, uneven color, and uneven luster. In the same manner, if the forward-rearward dot pairs exist in a regionally concentrating manner, the changes in the covered area in the state of FIG. 11C are obvious as uneven density, uneven color, and uneven luster. Therefore, it is preferable to disperse the forward-rearward dot pairs and the rearward-forward dot pairs as wide as possible. In the modified example, a dither mask is generated that realizes the halftone process for having the same number of rearward-forward dot pairs and forward-rearward dot pairs and for dispersing the rearward-forward dot pairs and the forward-rearward dot pairs spatially. Hereinbelow, a dither mask generating process according to the modified example will be described. In addition, either of the forward direction or the rearward direction corresponds to a first direction, and the other corresponds to a second direction.

Figure 12:
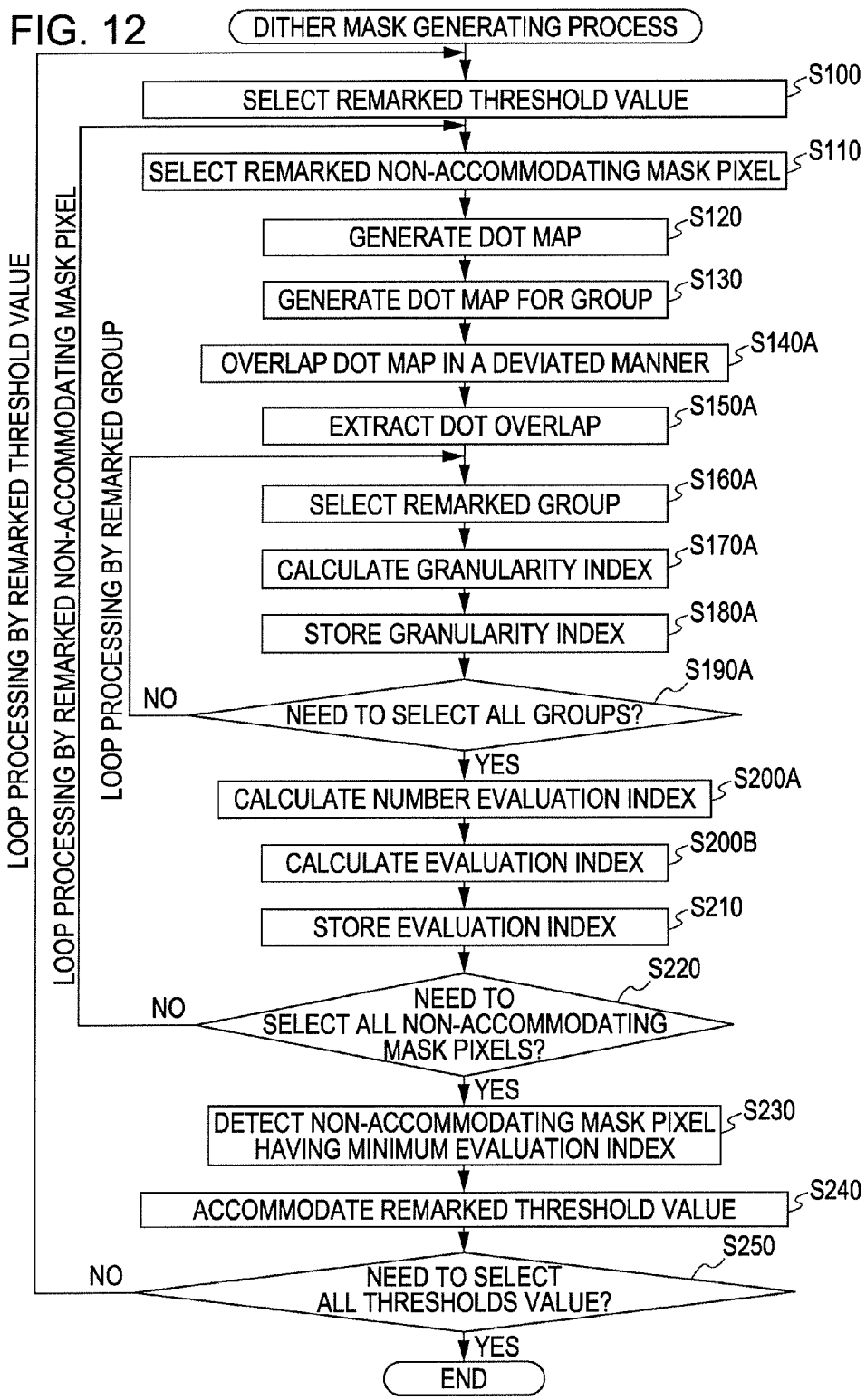
FIG. 12 is a flowchart illustrating a dither mask generation processing according to another modified example.

FIG. 12 shows the flow of the dither mask generating process according to the modified example. In the modified example, the same process as in the embodiment above is performed, but the process is performed different from Steps S140 to S200 of the embodiment. First, when the same Step S130 as in the embodiment is completed, the dot map generating portion P1c1 generates dot maps for groups GD9 and GD10 for the groups G9 and G10 in Step S140A. The dot maps for groups GD9 and GD10 are generated based on the dot map for group GD2 formed of the mask pixels of which the scanning direction of the main scanning pass is the forward direction and the dot map for group GD3 formed of the mask pixels of which the scanning direction of the main scanning pass is the rearward direction.

Figure 13:
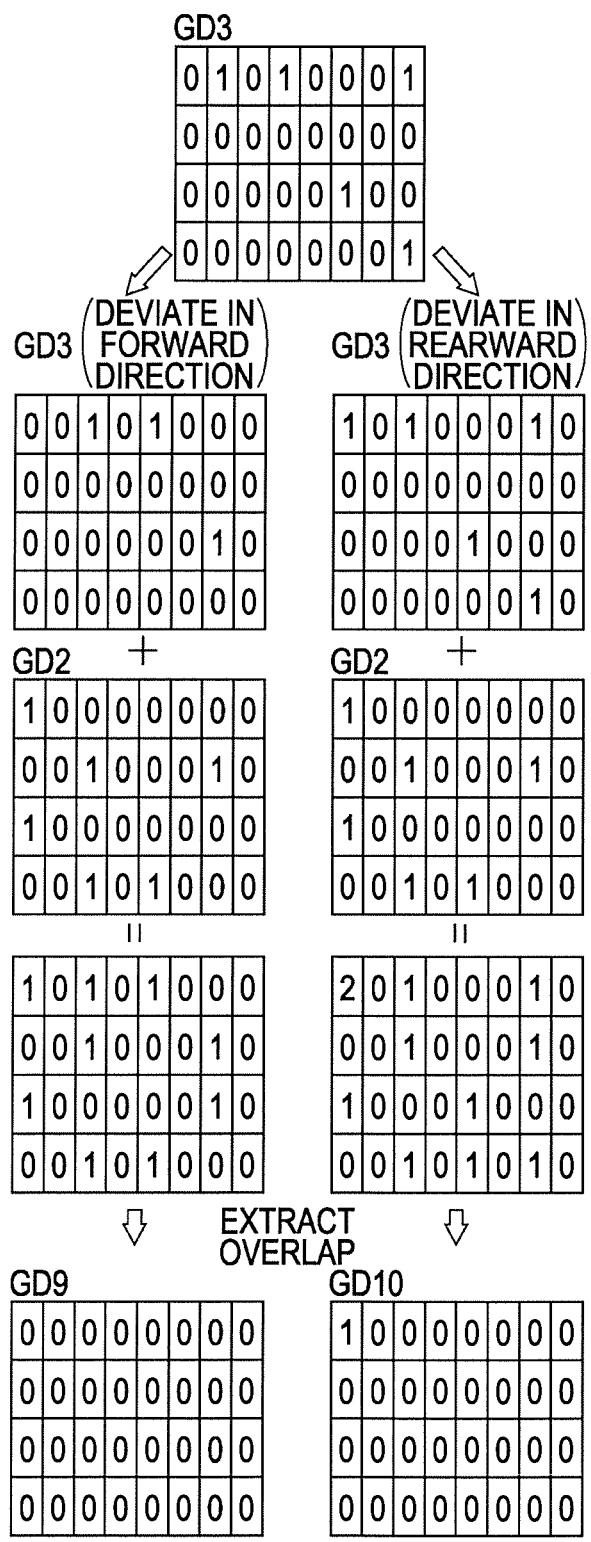
FIG. 13 is a diagram describing the generation of dot maps for each group according to the modified example.

FIG. 13 shows the generation of the dot maps for groups GD9 and GD 10. First, the dot map for groups GD2 and GD3 are acquired, and a dot map is obtained by deviating the dot map for group GD3 in the forward and rearward direction by one mask pixel. In addition, the dot map obtained by deviating the dot map for group GD3 in the forward and rearward direction is put together with the dot map for group GD2 (the grayscale value of mask pixels are overlapped). Furthermore, in Step S150A, by extracting mask pixels that have "2" or more grayscale value from the overlapped dot map (the grayscale value "1" is given only to the mask pixels having the grayscale value "2" or more, and the grayscale values for other mask pixels are set to "0"), the dot maps for groups GD9 and GD 10 are generated. When it is assume that the landing positions of ink drops are deviated by one mask pixel in FIGS. 11B and 11C, the mask pixel that has the grayscale value "1" in the dot map for group GD9 can be said to mean an overlapping rearward-forward dot pair in the state of FIG. 11B. In the same manner, the mask pixel that has the grayscale value "1" in the dot map for group GD10 can be said to mean an overlapping forward-rearward dot pair in the state of FIG. 11C.

When the dot maps for groups GD9 and GD10 are generated as shown above, the dispersibility index calculating portion P1c3 calculates the granularity index GI for each of the dot maps for groups GD1 to GD7, and GD9 to GD10 based on Equation (1) given above in Step S170A. In Step S180A, the RAM 12 stores the calculated granularity index GI. In Step S190A, the group classifying section P1a determined whether all the groups G1 to G7, and G9 to G10 are to be selected as remarked groups or not, and when all of the groups are not selected, the process returns to Step S160A to select the next remarked group.

In Step S200A, the evaluation index calculating section P1c calculates a number evaluation index NI. The number evaluation index NI is defined by an absolute value of a value obtained by subtracting the number of mask pixels having the grayscale value of "1" in the dot map for group GD10 from the number of mask pixels having the grayscale value of "1" in the dot map for group GD9. In the next Step S200B, the evaluation index EI is calculated based on Equation (6) given below.

Expression 6

$$EI = \Sigma \alpha_g GI_g + \alpha_{NI} NI \qquad (6)$$

As shown in Equation (6) above, the evaluation index EI calculated by the sum of the first term obtained by linear combination of the granularity index GI for the groups G1 to G7 and G9 to G10, and the second term obtained by weighting the number evaluation index NI with the weight coefficient $\alpha_{NI}$. Furthermore, in the modified example, g=1 to 7, and 9 to 10. Processes thereafter are the same as those in the embodiment above.

According to the evaluation index EI of Equation (6) above, the granularity index GI in the dot maps for groups GD9 and GD10 can generate an excellent dither mask M. As described above, since the dot maps for groups GD9 and GD10 shows a spatial distribution of rearward-forward dot pairs and forward-rearward dot pairs, respectively, it is possible to disperse the rearward-forward dot pairs and the forward-rearward dot pairs by adding the granularity index GI to the evaluation index EI for the dot maps. Furthermore, since the number evaluation index NI has a characteristic to become smaller as the numbers of rearward-forward dot pairs and forward-rearward dot pairs are the same, it is possible to make the numbers of rearward-forward dot pairs and forward-rearward dot pairs same by adding the number evaluation index NI to the evaluation index EI. Therefore, according to the dither mask generated by the modified example, it is possible to realize printing that has suppressed uneven density, uneven color, and uneven luster. Moreover, the modified example only focuses deviation in landing positions in the main scanning direction, but it may be possible to assume deviation in landing positions (error in paper feeding) in the sub scanning direction. In other words, it is possible to generated new dot maps for groups by deviating and putting together the dot maps for groups GD4 to GD7 in the sub scanning direction. In addition, the deviation amount is set to one mask pixel, but a greater amount may be assumed.

Furthermore, the modified example can employ an apparatus provided with a halftone unit that performs a halftone process for determining the possibility of dot formation for each pixel based on the grayscale values of pixels forming image data, and a print control unit that controls to form dots on a recording medium based on the possibility of dot formation by driving a print head which ejects ink drops during main scanning in the first direction and ejects the ink drops during the main scanning in the second direction opposite to the first direction. In the apparatus, the halftone unit determines the possibility of dot formation by controlling the generation of dot pairs based on a pre-set target number of the dot pairs constituted by dots formed by the main scanning in the first direction and dots formed by the main scanning in the second direction.

In this case, if the halftone process is performed by the dithering method, a dither mask is generated in advance which is obtained by optimizing a characteristic of generating the dot pairs based on the target number, and the possibility of dot formation is determined by using the generated dither mask. In other words, the modified example may employ a dither mask generating method by using the halftone process for determining the possibility of dot formation in each pixel based on the grayscale value of each pixel forming the image data. In the method, it is necessary to have an evaluation index that includes an index indicating a difference between the occurrence number of dot pairs constituted by dots formed by the main scanning in the first direction and dots formed by the main scanning in the second direction opposite to the first direction during printing operation, and the target number of the dot pairs that is set in advance according to the threshold values. The evaluation index is calculated for each case where the threshold values are accommodated in mask pixels that can accommodated the threshold values when the mask pixels constituting the dither mask accommodate threshold values for determining the possibility of the dot formation. In addition, according to the method, a mask pixel corresponding to the minimum evaluation index can accommodate the threshold values.

More specifically, in Step S200A above, the evaluation index calculating section P I c calculates another evaluation index (number evaluation index MI) for the number of dot pairs as above. The number evaluation index MI is defined by a difference (absolute value) between the sum of the number of forward-rearward dot pairs and the number of rearward-forward dot pairs and the target number of the dot pairs that is set in advance according to the grayscale value (remarked threshold value S). In other words, the evaluation index calculating section P1c obtains the sum of the number of the mask pixels having the grayscale value of "1" in the dot map for group GD9 (the number of rearward-forward dot pairs) and the number of the mask pixels having the grayscale value of "1" in the dot map for group GD 10 (the number of forward-rearward dot pairs), and obtains the difference between the sum and the target number above to calculate the number evaluation index MI.

Figure 22:
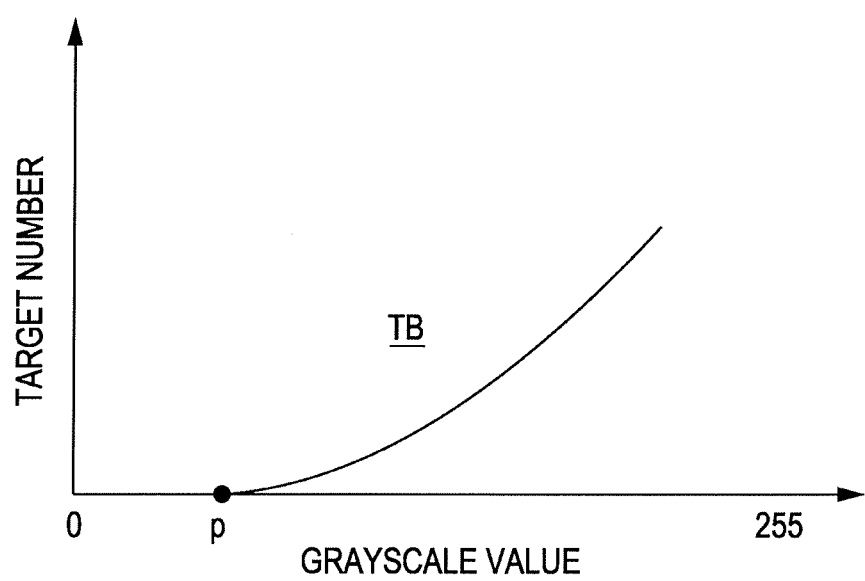
FIG. 22 is a graph exemplifying a target number definition table.

FIG. 22 exemplifies a target number definition table TB. The target number definition table TB is a table which defines a corresponding relationship between grayscale values from 0 to 255 and the ideal number of dot pairs (target number), and generated in advance to be stored in the HDD 14 or the like. In target number definition table TB, the target number is 0 within a certain range from 0, but the target number appears from a predetermined grayscale value of P in a low grayscale range, and then, the target number smoothly increases according to the increase of the grayscale value. The evaluation index calculating section P1c reads a target number corresponding to the grayscale value of the remarked threshold value S from the target number definition table TB at that time to use in the calculation of the number evaluation index MI.

When the number evaluation index MI is calculated in that manner, in the next Step S200B, the evaluation index EI is calculated based on Equation (6a) given below.

Expression 7

$$EI=\Sigma\alpha_g GI_g+\alpha_{NI}NI+\alpha_{MI} \quad (6a)$$

As shown in Equation (6a), the evaluation index EI is calculated by the first term obtained by linear combination of the granularity index GI for the groups G1 to G7 and G9 to G10, the second term obtained by weighting the number evaluation index NI with the weight coefficient $\alpha_{NI}$, and the third term obtained by weighting the number evaluation index MI with the weight coefficient $\alpha_{MI}$.

The number evaluation index MI has a characteristic to become smaller as the sum of the number of forward-rearward dot pairs and the number of rearward-forward dot pairs approximates to the target number that is in accordance with the remarked threshold value S. For that reason, by adding the number evaluation index MI to the evaluation index EI, it is possible to generate the dither mask M having a feature to make the sum of the number of forward-rearward dot pairs and the number of rearward-forward dot pairs equal to an ideal number. Here, when the dither mask M is generated according to the evaluation index EI of Equation (6a) above, it is possible to secure dispersibility of the forward-rearward and the rearward-forward dot pairs, and to make the number of forward-rearward dot pairs and the number of rearward-forward dot pairs equal to each other, as described above. However, when the dither mask M having such a feature is used in the halftone process, it is found that the occurrence of dot pairs tends to be suppressed in a low density area (low density area with the ink amount of 0 and approximate to 0) in an input image as a halftone object, and dot pairs tend to suddenly appear in an area with medium density (density corresponding to grayscale of which value is higher than the grayscale value p (FIG. 22)) to some extent.

If the dot pairs occur from the state where the dot pairs have not occurred, and when the deviation in landing position of ink drops takes place, a density change (change in a covered area) by the dot overlap occurs in the area where the dot pairs are shown. In other words, in the medium density area where dot pairs appear, the uneven density or the like by the dot overlap becomes remarkable. Therefore, in the modified example, by defining the target number definition table TB as described above and having the number evaluation index MI as an element of the evaluation index EI (while the dispersibility of each of the dot pairs are uniformity in the number of each of the dot pairs are secured), the dither mask M is realized which enables the dot pairs to occur in an ideal number from a low density (density corresponding to the grayscale value p) to some extent. For that reason, as a result of halftone process, the occurrence of uneven density or the like by the dot overlap is suppressed at all levels of density areas in the input image, there is no such a density area where uneven density or the like is particularly remarkable.

Furthermore, the evaluation index calculating section P1c may calculate the number evaluation index MI for the number of forward-rearward dot pairs and the number of rearward-forward dot pairs, respectively. In other words, the difference between the number of dot pairs and a value which is a half of the target number is to be the number evaluation index MI for the number of forward-rearward dot pairs, and the difference between the number of rearward-forward dot pairs and the value which is a half of the target number is to be the number evaluation index MI for the number of rearward-forward dot pairs. In addition, the two number evaluation indexes MI (appropriately, by multiplying the indexes by a predetermined weight coefficient) may be included in the evaluation index EI.

In the next Modified Example 3, the error diffusion method that can bring about the same effect as that in the modified example above will be described.

C-3. Modified Example 3

Figure 14:
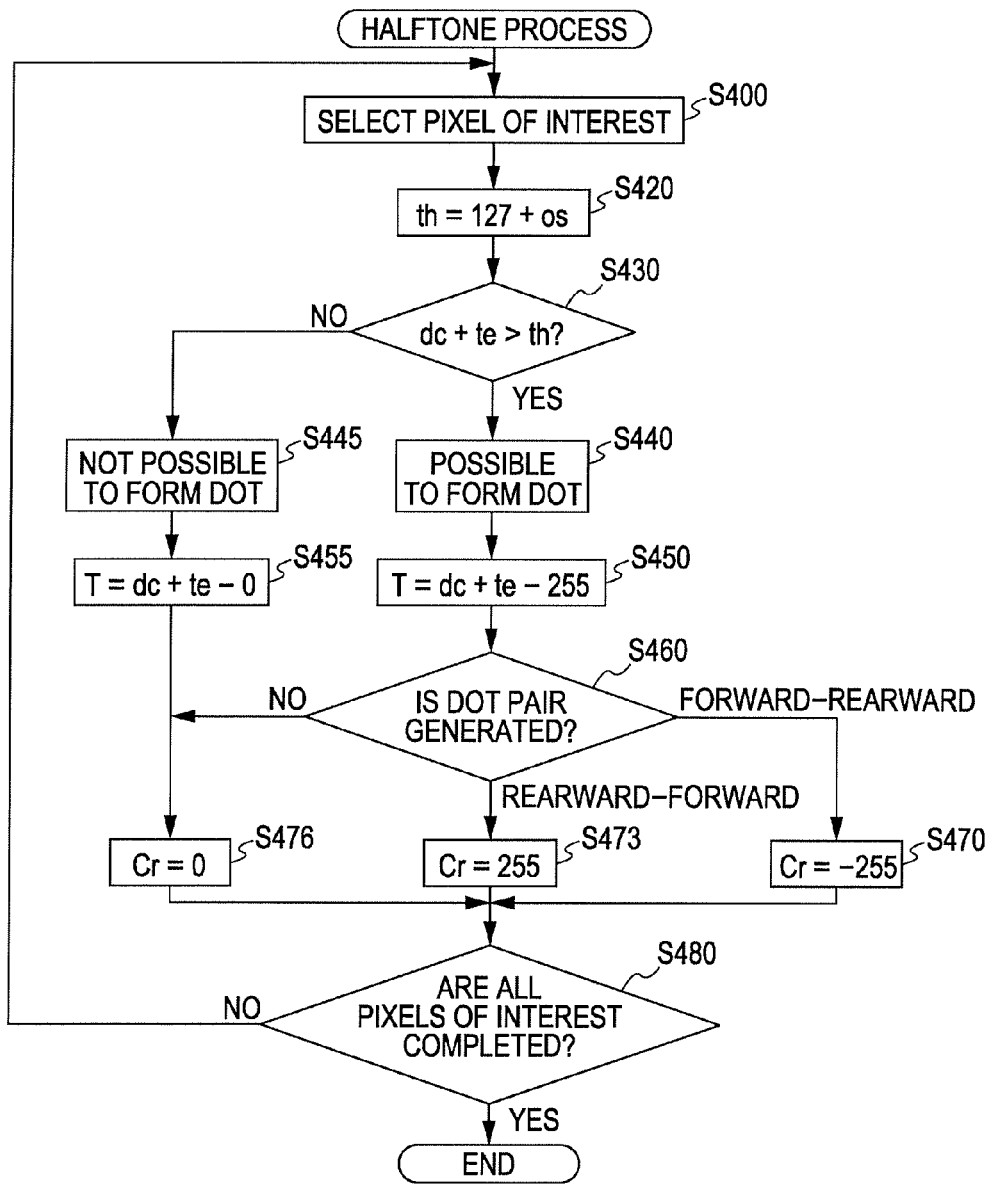
FIG. 14 is a flowchart illustrating the flow of halftone processing according to another modified example.
Figure 15:
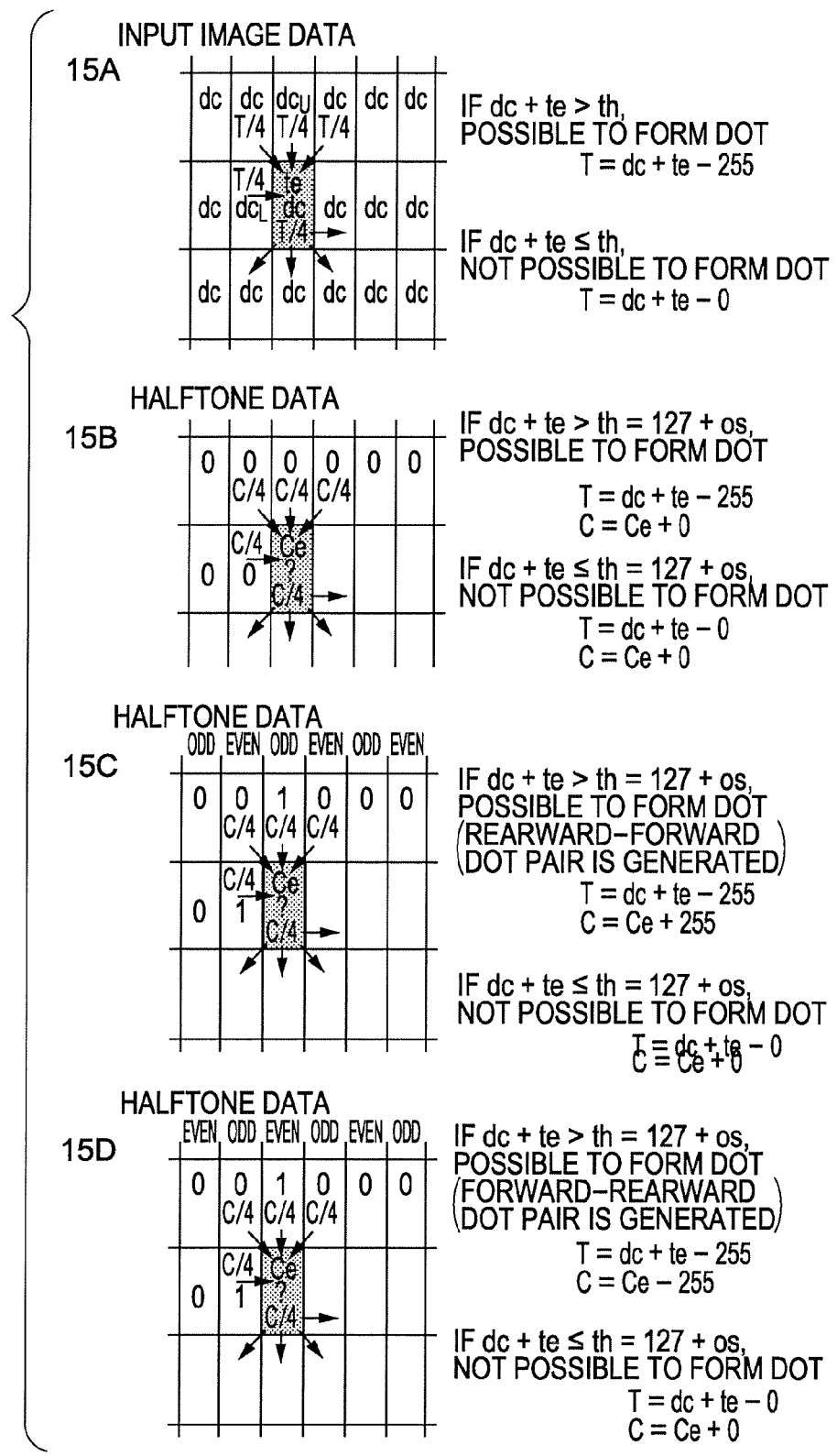
FIG. 15 is a diagram describing the flow of the halftone processing according to the modified example.

FIG. 14 and FIG. 15 show a flowchart and a schematic diagram illustrating the flow of halftone processing of the modified example. The composition of hardware and software that realizes the modified example is the same as that in the previous Modified Example 1. As shown in FIG. 15A, the basic order of the error diffusion method is the same as that in the previous Modified Example 1. In this modified example, a value obtained by adding the offset amount os to 127 (127+os) is acquired as the threshold value th (Step S420). The offset amount os is defined based on Equation (7) given below.

Expression 8

$$os = Ce \times K \quad (7)$$

In Equation (7) above, Ce indicates an accumulative adjustment value for setting the easiness of occurrence of rearward-forward dot pairs and forward-rearward dot pairs in a pixel of interest. The accumulative adjustment value Ce is a value obtained by accumulating a diffusion value of an adjustment value C obtained in each pixel, and the adjustment value C can be obtained based on Equation (8) given below.

Expression 9

$$C = Ce + Cr \quad (8)$$

In Equation (8) above, Cr indicates an occurrence value. In the modified example, the occurrence value Cr is set to a different value according to an occurrence state of dot pairs. Based on the fact that dots are formed in a pixel of interest, the dot overlap determining portion P2c1 determines what kind of dot pair occurs (Step S460). As shown in FIG. 15C, the occurrence value Cr is 255 when rearward-forward dot pairs are caused to appear in the pixel of interest (Step S473). As shown in FIG. 15D, the occurrence value Cr is −255 when forward-rearward dot pairs are caused to appear in the pixel of interest (Step S470). In other cases (cases where dots are not formed and where dots are formed which have no adjacent dots in the left side as shown in FIG. 15B), the value is 0 (Step S476). Here, the case where the rearward-forward dot pairs are caused to occur in the pixel of interest is that the dots are formed in a pixel in the left side of the pixel of interest and the dots in the pixel in left side are formed by the main scanning pass in the rearward direction, is a case where the dots are formed in the pixel of interest. Furthermore, it is possible to specify whether the dots in the pixel in the left side are formed by the main scanning pass in the rearward direction based on the pass decomposing matrix. When the same pass decomposing matrix as in the embodiment above is used, the rearward direction corresponds to an even-numbered column. The case where the forward-rearward dot pairs are caused to occur in the pixel of interest is that the dots are formed in a pixel in the left side of the pixel of interest and the dots in the pixel in left side are formed by the main scanning pass in the forward direction, is a case where the dots are formed in the pixel of interest.

If the rearward-forward dot pairs are caused to occur in the pixel of interest, 255 as the occurrence value Cr is added to the adjustment value C. For that reason, a diffusion value obtained by dividing the adjustment value C by 4 diffuses in the peripheral pixels adjacent to the lower left, immediate lower, lower right, and right of the pixel of interest, and is added to the accumulative adjustment value Ce for the peripheral pixels. Since the offset amount os in proportion to the accumulative adjustment value Ce is added to the threshold value th, the occurrence of dots is suppressed around the rearward-forward dot pairs. On the other hand, if the forward-rearward dot pairs are caused to occur in the pixel of interest, −255 as the occurrence value Cr is added to the adjustment value C, and thereby the occurrence of the dots around the forward-rearward dot pairs is promoted. Therefore, it is easy to cause the dots to occur in the pixels adjacent to the right side to be processed next to the pixel of interest that causes the occurrence of the forward-rearward dot pairs. In other words, the rearward-forward dot pairs easily occur in the pixel adjacent to the right side which becomes the next pixel of interest. As described above, if the rearward-forward dot pairs occur, the occurrence of dots is suppressed around the rearward-forward dot pairs, and thereby the rearward-forward dot pairs and the forward-rearward dot pairs to occur in the next time can be positioned apart from each other. Accordingly, it is possible to cause the rearward-forward dot pairs and the forward-rearward dot pairs to occur one-on-one, and to prevent the rearward-forward dot pairs and the forward-rearward dot pairs from concentrating regionally. Therefore, according to the error diffusion method of the modified example, it is possible to realize printing that suppresses uneven density, uneven color, and uneven luster. In addition, the offset amount os and the accumulative adjustment value Ce corresponds to the evaluation index of the invention.

C-4. Modified Example 4

Figure 16:
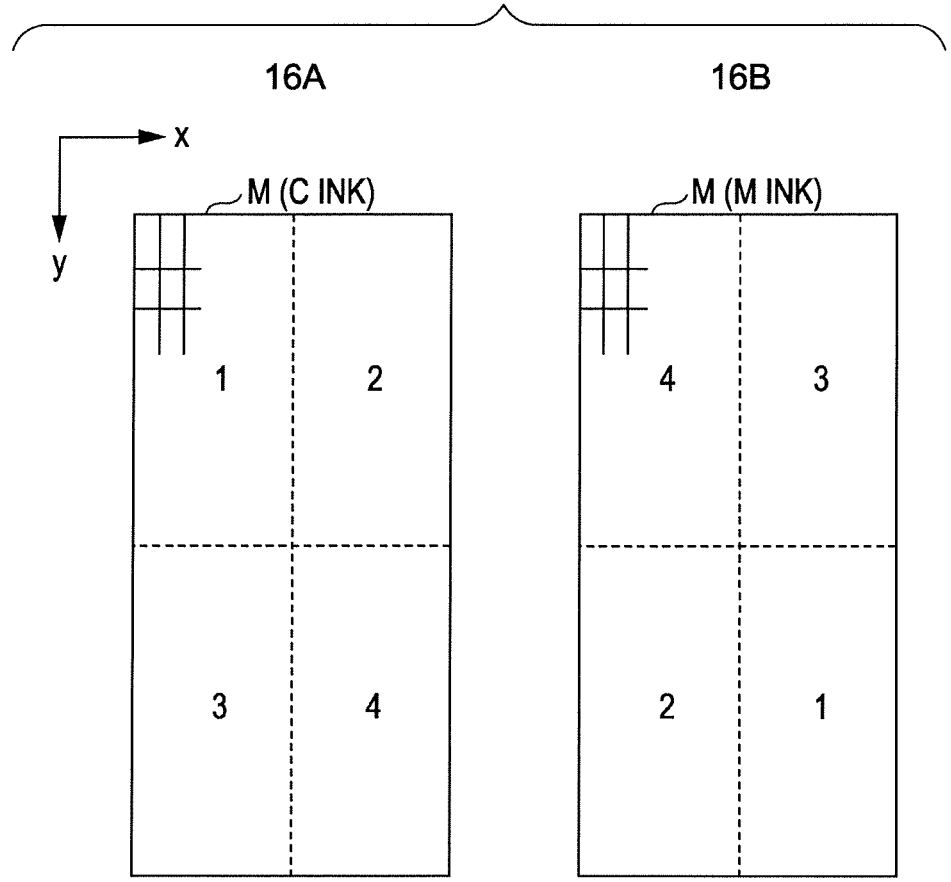
FIG. 16 is a diagram describing the use of a dither mask according to the modified example.

FIG. 16 shows a dither mask M (16 rows and 16 columns) used in a halftone process in the modified example. The printer 20 can eject CMYK inks also in this modified example, and FIG. 16 schematically shows the dither mask M for C ink and M ink amount them. Even in the modified example, the possibility of dot formation for each pixel in the input image data is determined with reference to the dither mask M. The halftone process is performed by using C ink and M ink while referring to the shared dither mask M, but differently, the mask pixels to be referred to in the dither mask M use C ink and M ink. In the modified example, the mask pixels will be referred to which is in a deviated position by half of the vertical width and the horizontal width of the dither mask M in the vertical and horizontal directions for M ink.

FIG. 16A shows the dither mask M divided into areas 1 to 4 by dividing the dither mask M into four by bisectors in the vertical and horizontal directions. With respect to a certain pixel of interest, when a mask pixel of a coordinate (x, y) in the area 1 is referred to for C ink, a mask pixel of a coordinate (x+8, y+8) is referred to for M ink. Accordingly, a mask pixel in the area 4 is referred to for M ink. With respect to a certain pixel of interest, when a mask pixel of a coordinate (x, y) in the area 2 is referred to for C ink, a mask pixel of a coordinate (x−8, y+8) is referred to for M ink. Accordingly, a mask pixel in the area 3 is referred to for M ink. With respect to a certain pixel of interest, when a mask pixel of a coordinate (x, y) in the area 3 is referred to for C ink, a mask pixel of a coordinate (x+8, y−8) is referred to for M ink. Accordingly, a mask pixel in the area 2 is referred to for M ink. With respect to a certain pixel of interest, when a mask pixel of a coordinate (x, y) in the area 4 is referred to for C ink, a mask pixel of a coordinate (x−8, y−8) is referred to for M ink. Accordingly, a mask pixel in the area 1 is referred to for M ink. From the above, conceptually, the dither mask M in which the areas 1 to 4 are arranged as shown in FIG. 16B is used for M ink. Actually, since the coordinate (x, y) to be referred to may be offset, the dither mask M may not be stored and generated for C ink and M ink.

Figure 17:
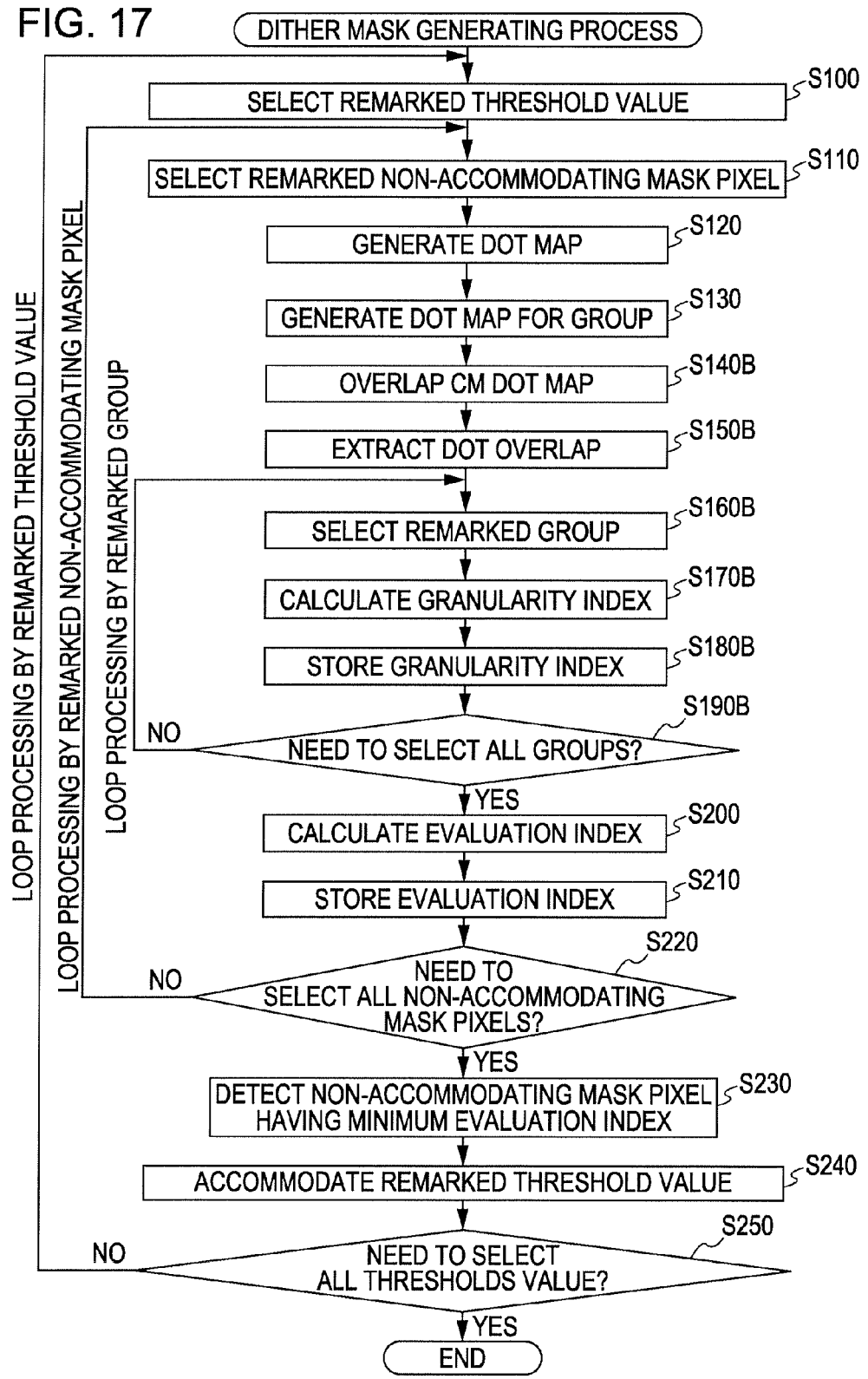
FIG. 17 is a flowchart illustrating a dither mask generation processing according to the modified example.

FIG. 17 shows the flow of a dither mask generating process according to the modified example. In the modified example, the same process as that in the embodiment above is performed, but a different process is performed for Steps S140 to S190 of the embodiment. First, when the Step S130 is completed in the same manner as in the embodiment, the dot map generating portion P1c1 generates a dot map for group GD11 for a group G11 in Step S140B. The dot map for group GD11 is generated based on the dot map for group GD1 constituted by all the mask pixels.

Figure 18:
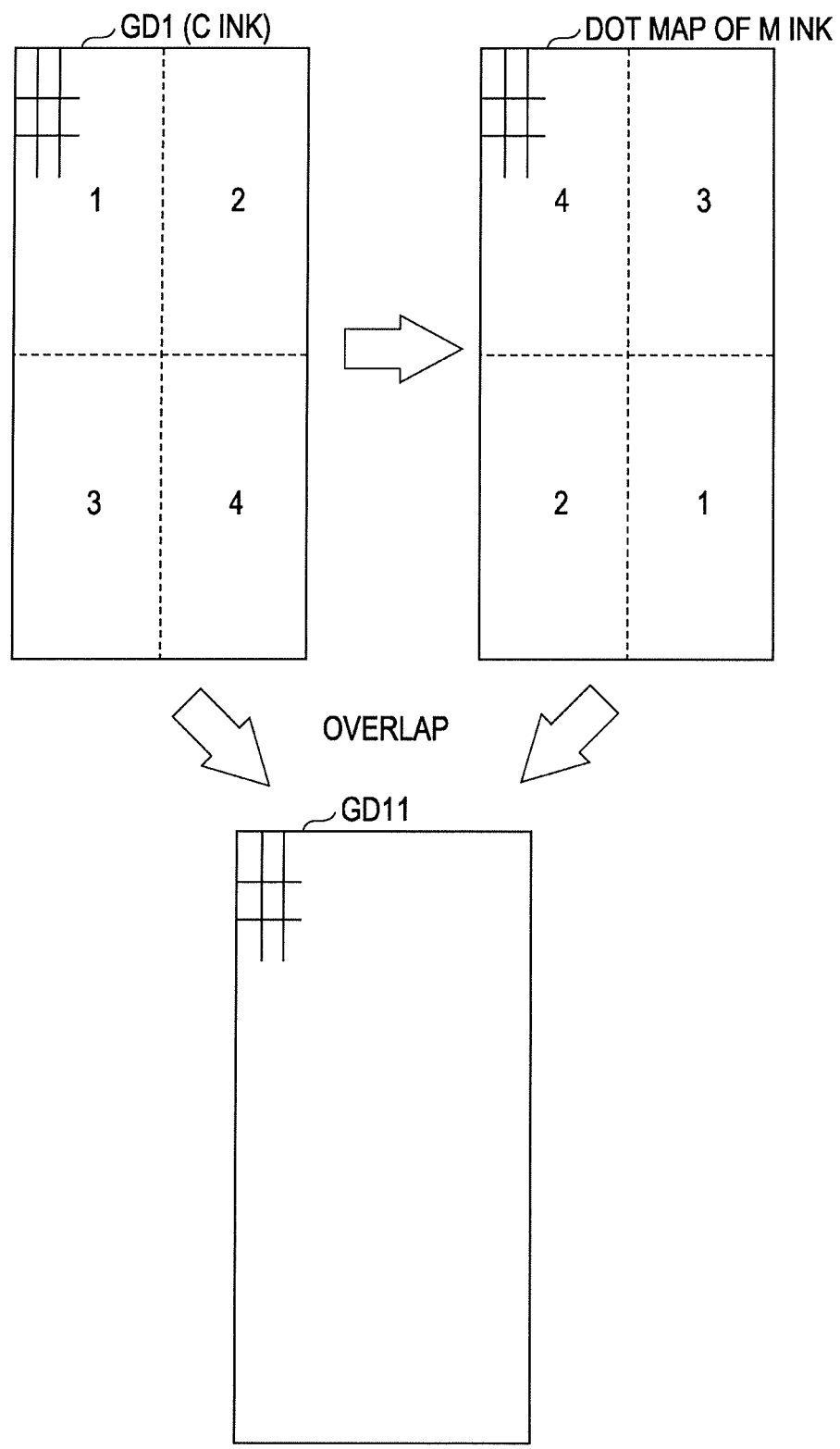
FIG. 18 is a diagram describing the formation of a dot map for each group of the modified example.

FIG. 18 shows the generation of the dot map for group GD11. First, the dot map for group GD1 is acquired, and the dot map for group GD1 and a dot map for M ink obtained by deviating the dot map for group GD1 by half of the vertical and horizontal widths of the dither mask M in the vertical and horizontal directions. Areas 1 to 4 are formed also in the dot map for group GD1 in the same manner as shown in FIG. 16A, and the areas 1 to 4 may be moved in accordance with the arrangement of the dither mask M for M ink as shown in FIG. 16B. When the dot map for M ink is generated, the dot map for group GD1 and the dot map for M ink are put together (the grayscale values of each of the mask pixels are overlapped). Moreover, in Step S150B, the dot map for group GD11 is generated by extracting mask pixels having the grayscale value of "2" or more from the dot map which is put together (the grayscale value "1" is given only to the mask pixels with the grayscale value of "2" or more, and the grayscale value is "0" to other mask pixels). The dot map for group GD11 is shown in the position where the dots of C ink and the dots of M ink are overlapped with each other when solid input image data having the grayscale value of the ink amount obtained by adding 1 to the remarked threshold value S is subjected to the halftone process.

When the dot map for group GD11 is generated as described above, the dispersibility index calculating portion P1c3 calculates the granularity index GI for the dot maps for groups GD1 to GD7 and GD11 based on Equation (1) above in Step S170B. In Step S180B, the RAM 12 stores the calculated granularity index GI. In Step S190B, the group classifying section P1a determines whether all the groups G1 to G7 and G11 are to be selected as remarked groups or not, and when all of the groups are not selected, the process returns to Step S160B to select the next remarked group. The process thereafter is the same as in the embodiment above.

In the modified example, since the granularity index GI is added to the evaluation index EI based on the dot map for group GD11, the dither mask M can be generated in which dot overlaps of M ink and dots of C ink can be prevented from occurring, cause dispersion thereof in printing. It is preferable to form dots of each ink independently of each other, but unintended print result (such as color appearance) can be obtained by mixing dots of different inks. In the modified example, since the dot overlaps of M ink and the dots of C ink can be suppressed, a print result can be obtained as intended. In addition, since the dot overlaps of M ink and the dots of C ink are dispersed, mixing of C ink and M ink may be difficult to be recognized. Furthermore, even ink blots or the like among plural inks cab be suppressed. In the modified example, the relationship between C ink and M ink has been described, but the same process can be performed for other ink as long as the dither mask M is also used. In addition, an example has been shown in which the dither mask M is deviated by half in the vertical direction and the horizontal direction, respectively, but the technique of the modified example can be applied even to a case where the dither mask M is deviated in one direction. Moreover, the technique of the modified example can be applied even to a case where the dither mask M is used after being reversed or rotated.

C-5. Modified Example 5

Figure 19:
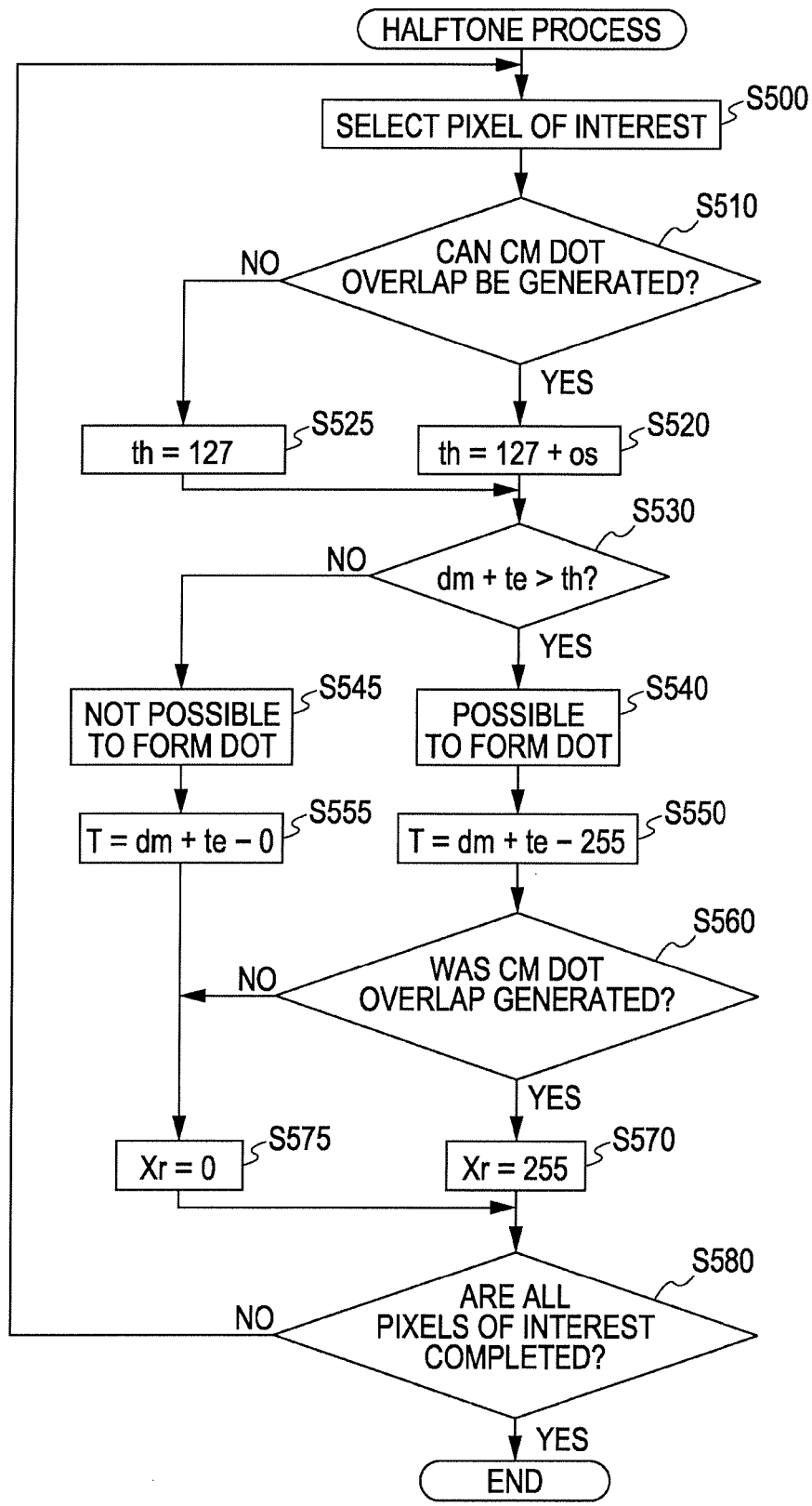
FIG. 19 is a flowchart illustrating the flow of halftone processing according to another modified example.
Figure 20:
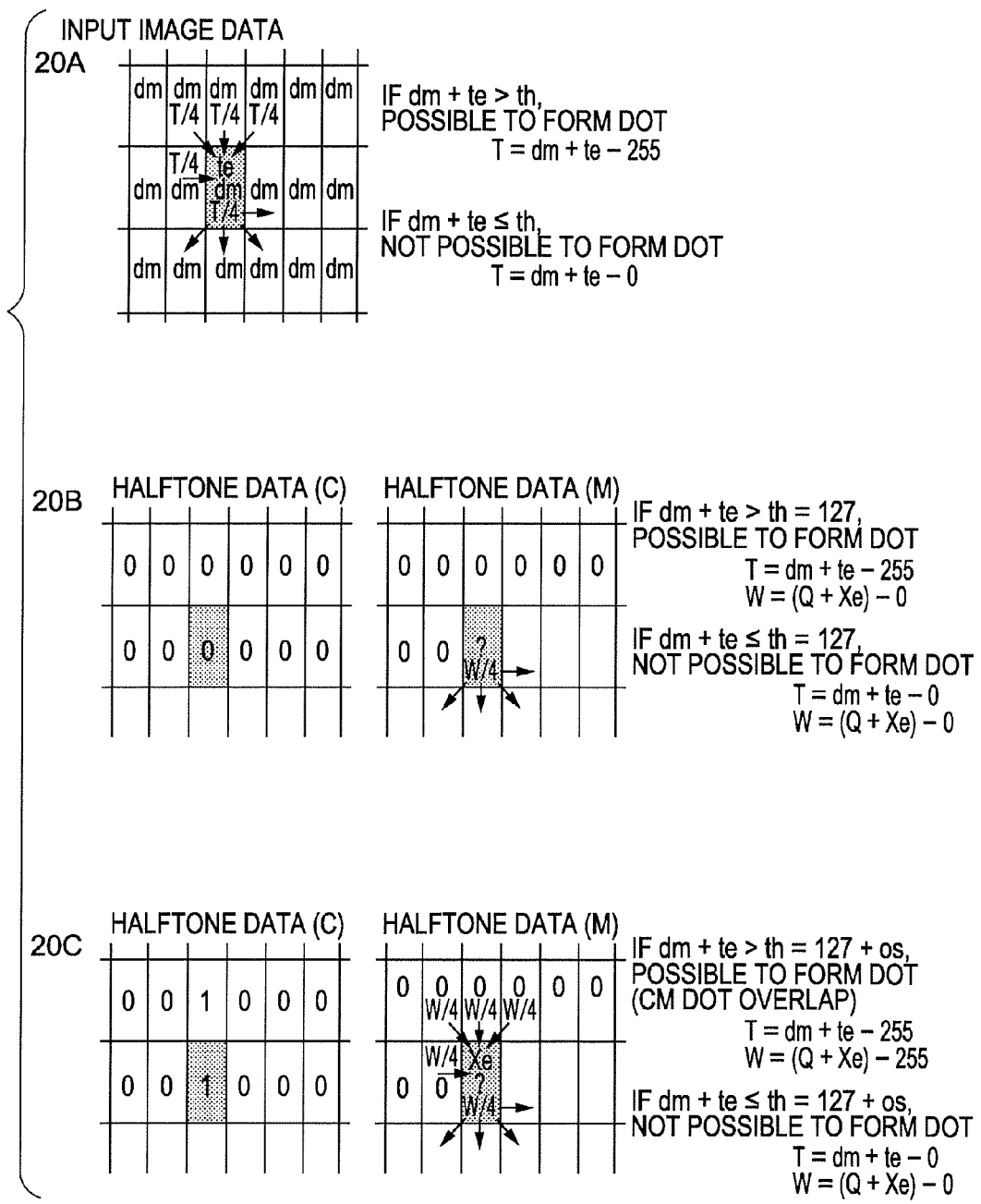
FIG. 20 is a diagram describing the flow of the halftone processing according to the modified example.

FIG. 19 and FIG. 20 show a flowchart and schematic diagram illustrating the flow of a halftone process of the modified example. The composition of hardware and software that realizes the modified example is the same as that in Modified Example 1 above. In this modified example, the printer 20 can eject C (cyan), M (magenta), Y (yellow), and K (black) inks, and FIG. 19 and FIGS. 20A to 20C show that the halftone processing unit performs a halftone process in the error diffusion method for M ink among the inks. In the stage where the halftone process is performed for M ink, the halftone process for C ink is completed, and halftone data for C ink is stored, for example, in RAM 12. In addition, the halftone process for C ink may be performed in any of the dithering method and the error diffusion method. Basic procedure of the error diffusion method is the same as that of Modified Example 1 above as shown in FIG. 20A.

The threshold value th is set to 127 in principle, but when dots of C ink are formed for a pixel of interest as shown in FIG. 20C, the threshold value th is acquired which is adjusted to a value obtained by adding the offset amount os to 127 (127+os) (Step S520). On the other hand, when dots of C ink are not formed for a pixel of interest as shown in FIG. 20B, the threshold value th is set to 127 as the principle (Step S525). The offset amount os is defined based on Equation (9) given below.

Expression 10

$$os = 1 \times (Q + Xe) \times K \quad (9)$$

In Equation (9) above, Q indicates a set value for setting easiness in occurrence of dot overlaps of C and M inks in a pixel of interest. Xe indicates an accumulative adjustment value for the pixel of interest, and K indicates a weight coefficient. The set value Q is obtained based on Equation (10) or Equation (11) given below.

Expression 11

$$Q = (dc/255)(dm/255) \times 255 \quad (10)$$

$$Q = 0.5 \times (dc/255)(dm255) \times 255 \quad (11)$$

As shown Equations (10) and (11) above, the set value Q is a value for a probability that dots of C ink and dots of M ink overlap with each other when the possibility of dot formation is determined at outright random, and gets greater as the grayscale values dc and dm of the ink amount of the pixel of interest gets greater. Furthermore, according to Equation (9) above, as the grayscale value dm of the ink amount of the pixel of interest gets greater, the offset amount os gets smaller, and thereby, the threshold value th is offset with a smaller value. In other words, as the grayscale value dm of the ink amount of the pixel of interest gets greater, the offset amount os acts so that dot overlaps easily occur.

As shown in FIG. 20C, the accumulative adjustment value Xe is a value obtained by accumulating a diffusion value obtained by dividing an adjustment value W, which is generated when peripheral pixels adjacent to the upper left, immediate upper, upper right, and left of the pixel of interest are focused, by four. The adjustment value W is obtained based on Equation (12) given below.

Expression 13

$$W=(Q+Xe)-Xr \qquad (12)$$

In Equation (12) above, Xr indicates an occurrence value. The occurrence value Xr is set to a different value according to the occurrence of dot overlaps between dots of C ink and M ink in the pixel of interest. The dot overlap determining portion P2c1 determines whether dot overlap between dots occurs or not based on the fact that the dots are formed in the pixel of interest (Step S560). Here, as shown in FIG. 20C, when the dots of M ink is formed on the dots of C ink in an overlapping manner in the pixel of interest, the occurrence value Xr is 255 (Step S570), and in other cases (where dots are not formed and where dots are formed without overlap), the occurrence value Xr is 0 (Step S575).

Accordingly, when the dots of M ink and the dots of C ink are formed and overlap with each other in the pixel of interest, the adjustment value W tends to be small, and in other cases, the adjustment value W tends to be relatively large. The value obtained by dividing the adjustment value W by four diffuses in peripheral pixels adjacent to the lower left, immediate lower, lower right and right of the pixel of interest, and is reflected in the accumulative adjustment value Xe for the pixels. According to Equation (9) above, as the accumulative adjustment value Xe gets smaller, the threshold value th is offset with a greater value so that the dot overlaps of C ink and M ink hardly occur. In other words, when the dots of M ink and the dots of C ink are formed and overlap with each other in the pixel of interest, the occurrence of dot overlaps of C ink and M ink in the peripheral pixels adjacent to the lower left, immediate lower, lower right, and right of the pixel of interest can be suppressed.

Furthermore, since the accumulative adjustment value Xe contributes to the adjustment value W of pixels adjacent to in that order while reducing the contribution rate, it is possible to hardly generate the dot overlaps of C ink and M ink not only in pixels directly adjacent to the pixels where the dot overlaps of C ink and M ink have been generated, but also pixels far by a few pixels from the pixels where the dot overlaps of C ink and M ink have been generated. Therefore, the pixels where the dot overlaps of C ink and M ink are generated can be prevented from concentrating regionally, and the pixels with the dot overlaps can be dispersed overall. In addition, the weight coefficient K is a coefficient for adjusting the range of variation of the offset amount os, and for example, is set to adjust the offset amount os to be a few % to dozens % from the whole. It is preferable to make the weight coefficient K greater to the extent that the fidelity of a printed image for the input image data is not obvious. As described above, according to the modified example, the dot overlaps of C ink and M ink can be predicted and caused to disperse spatially through the error diffusion process. In addition, the offset amount os and the accumulative adjustment value Xe correspond to the evaluation index of the invention.

C-6. Modified Example 6

Figure 23:
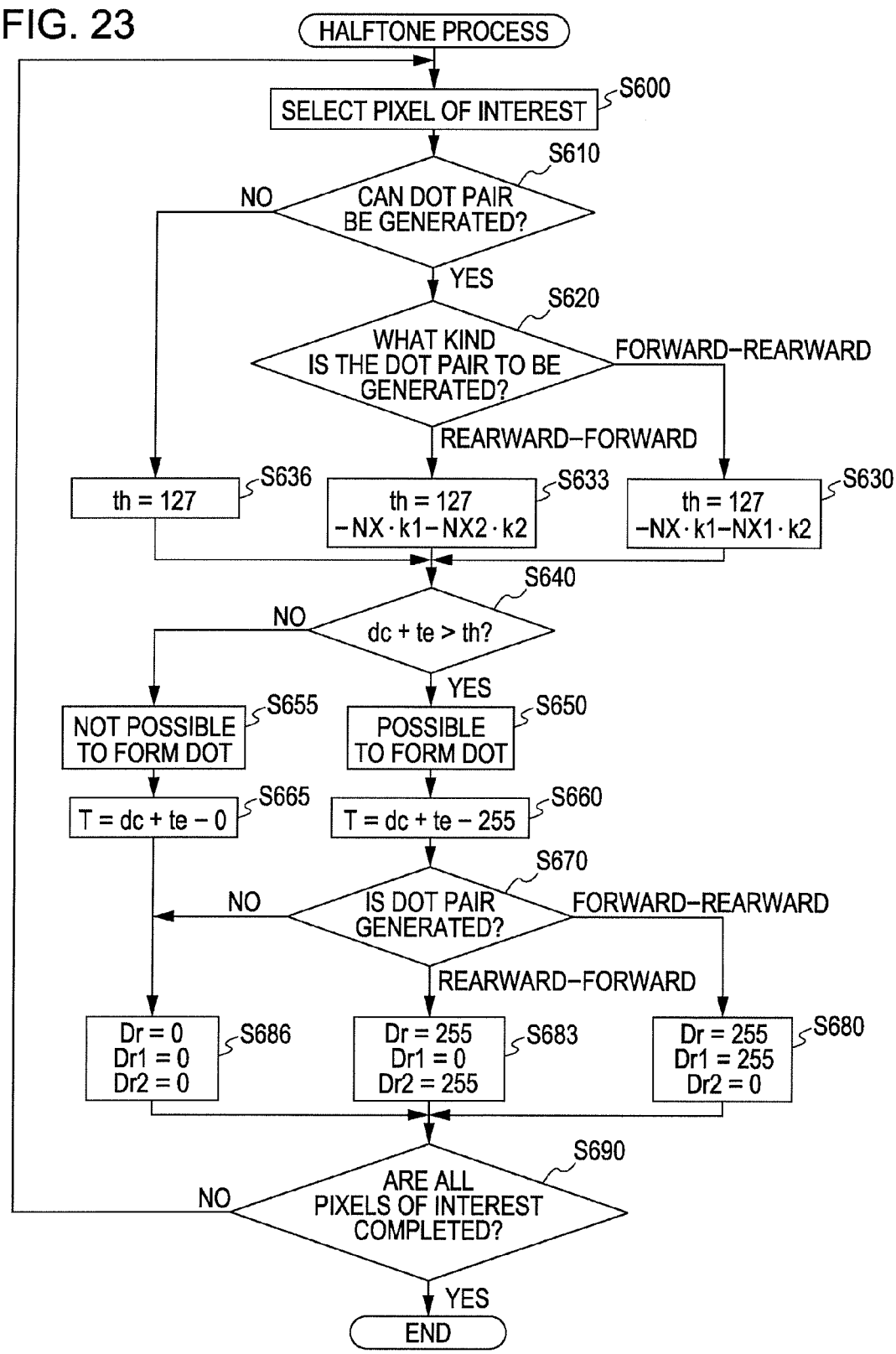
FIG. 23 is a flowchart illustrating the flow of a halftone processing according to another modified example.

FIG. 23 shows a flowchart illustrating the flow of a halftone process of this modified example. The modified example is further modified example of Modified Example 3 shown above. The composition of hardware and software that realizes this modified example is the same as that in Modified Example 1, and the halftone process is realized in the error diffusion method by the function of the halftone processing section P2c. The basic procedure of the modified example is the same as that of Modified Example 1 above. However, based on a pre-set target number for the number of dot pairs constituted by dots formed by the main scanning in the first direction and dots formed by the main scanning in the second direction, the occurrence of dot pairs is suppressed and the possibility of dot formation is determined. In this case, a threshold value, which determines the possibility of dot formation of which dots form the dot pairs, is changed according to the target value. Specifically, in the modified example, in parallel with an error diffusion process of the ink amount, another error diffusion process is performed which is limited to a process where an error between a target occurrence rate of dot pairs, which is set according to the ink amount, and actual dot pair occurrence result is calculated, and dispersed near non-processed pixels. More specifically, based on a correction target value obtained by adding a target occurrence rate error of dot pairs dispersed from near non-processed pixels to a target occurrence rate of the dot pairs, the threshold value in a binarization process (halftone process) of the ink amount is varied. For example, in the position of a pixel of interest under the binarization process, when the dot pairs are not newly generated even in an ON state of dots (dot formation), the threshold value is not corrected. On the other hand, when dot pairs are newly generated in the ON state of dots, the threshold value is varied in the binarization process of the ink amount based on the correction target value. Since a case of a negative correction target value indicates that occurrence of dots has already exceed the target occurrence rate, the dots are controlled to hardly become in the ON state by increasing the threshold value. Since a case of positive correction target value indicates that the occurrence of dots is insufficient for the target occurrence rate, the dots are controlled to easily become in the ON state by decreasing the threshold value.

After the pixel of interest is selected in Step S600, the halftone processing section P2c determined whether dot pairs can be generated or not in Step S610. At this time, when dots are decided to be formed in a pixel adjacent to the left side of the pixel of interest, it is determined that the dot pairs can be generated and the process advances to Step S620. On the other hand, when dots are decided not to be formed in a pixel adjacent to the left side of the pixel of interest, it is determined that the dot pairs cannot be generated and the process advances to Step S636. In Step S620, the halftone processing section P2c determines whether forward-rearward dot pairs can be generated, or rearward-forward dot pairs can be generated, and when it is determined that the forward-rearward dot pairs can be generated, the process advances to Step S630. When it is determined that the rearward-forward dot pairs can be generated, the process advances to Step S633. In other words, when it is specified that the dots in the pixel adjacent to the left side are formed by the main scanning pass in the forward direction (or, the pixel of interest is a pixel in a position where the dots are formed by the main scanning pass in the rearward direction), the process advances to Step S630, and when it is specified that the dots in the pixel adjacent to the left side are formed by the main scanning pass in the rearward direction (or, the pixel of interest is a pixel in a position where the dots are formed by the main scanning pass in the forward direction), the process advances to Step S633.

In Step S630, the halftone processing section P2c sets the threshold value th based on Equation (13) given below.

$$th=127-NX\cdot k1-NX1\cdot k2 \qquad (13)$$

In Step S633, the halftone processing section P2c sets the threshold value th based on Equation (14) given below.

$$th=127-NX\cdot k1-NX\cdot k2 \qquad (14)$$

In Step S636, the threshold value th=127, as the principle.

In Equations (13) and (14) above, NX is a correction target value, and obtained based on Equation (15) given below. In Equation (13), NX1 is a first correction target value, and obtained based on Equation (16) given below. In Equation (14), NX2 is a second correction target value, and obtained based on Equation (17) given below. k1 and k2 are predetermined weight coefficients.

$$NX=N+De \quad (15)$$

$$NX1=N1+De1 \quad (16)$$

$$NX2=N2+De2 \quad (17)$$

In Equation (15) above, N indicates a target occurrence rate of dot pairs according to the target number described in Modified Example 2, and will be referred to as a target occurrence value N hereinbelow. The halftone processing section P2c read out a target number corresponding to the grayscale value dc of the ink amount of the pixel of interest from the target number definition table TB (FIG. 22), and standardize the read target number into a numerical value (target occurrence value N) expressed in a range (0 to 255) where the grayscale value of the ink amount can be obtained. In this case, a value obtained by multiplying a ratio of the target number corresponding to the grayscale value dc to the maximum value of the target number defined in the target number definition table TB (0 to 100%) by 255 is the target occurrence value N. In Equation (16) above, N1 is a target occurrence rate of forward-rearward dot pairs (target occurrence value N1), and here, N1=N/2, simply. In Equation (17) above, N2 is a target occurrence rate of rearward-forward dot pairs (target occurrence value N2), and here, N2=N/2, simply.

Figure 24:
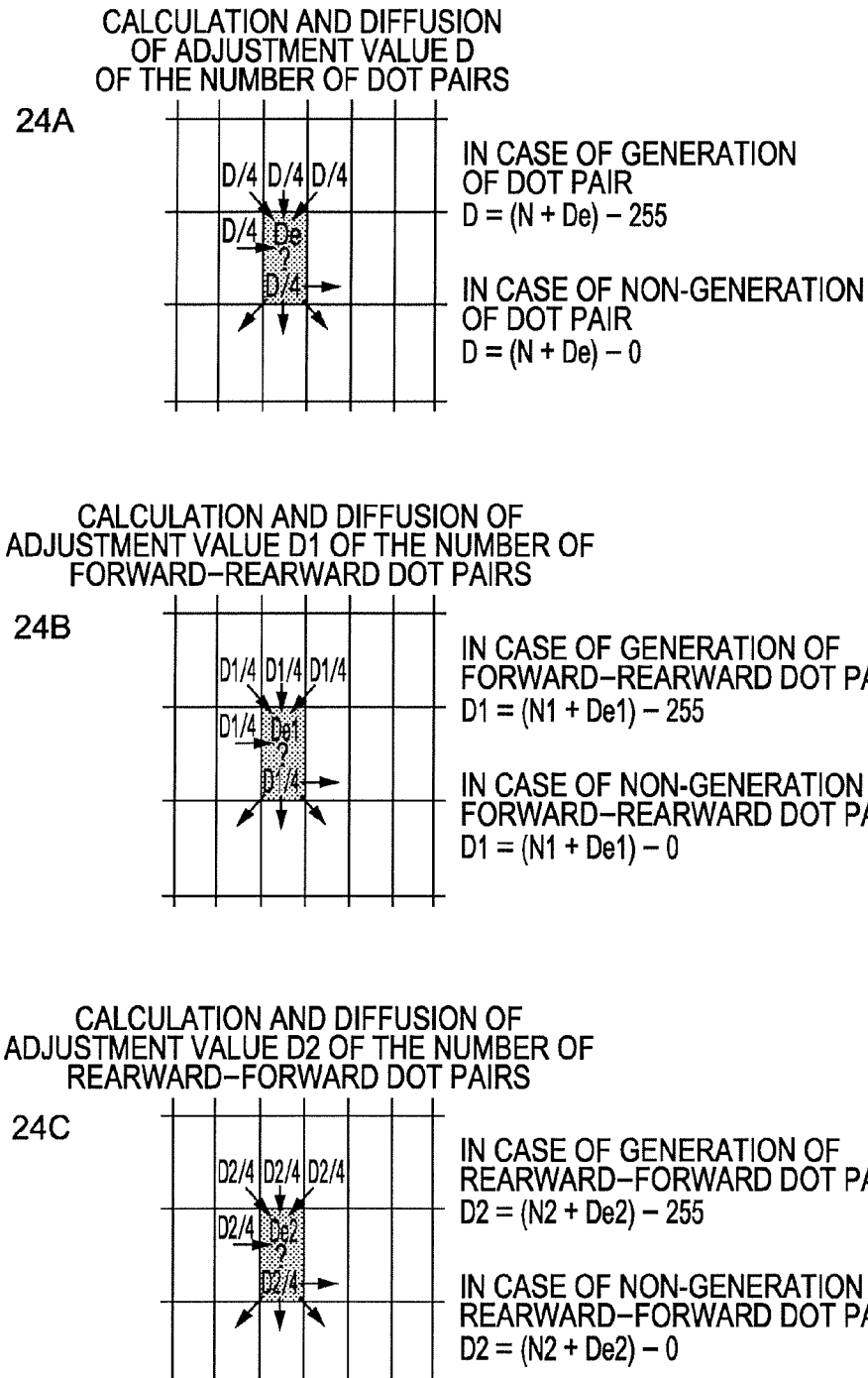
FIG. 24 is a diagram describing the flow of the halftone processing according to the modified example.

In Equation (15) above, De an accumulative adjustment value for correcting the target occurrence value N of a pixel of interest, and, as shown in FIG. 24A, the accumulative adjustment value De is obtained such that diffusion values (D/4) of adjustment values (adjustment values of the number of dot pairs) D generated when peripheral pixels adjacent to the upper left, immediate upper, upper right and left of the pixel of interest are respectively focused are accumulated in the pixel of interest. In the same manner, De1 in Equation (16) above is an accumulative adjustment value for correcting the target occurrence value Ni of the forward-rearward dot pairs, and, and shown in FIG. 24B, the accumulative adjustment value De1 is obtained such that diffusion values (D1/4) of adjustment values (adjustment values of the number of forward-rearward dot pairs) D1 generated when the peripheral pixels adjacent to the upper left, immediate upper, upper right and left of the pixel of interest are respectively focused are accumulated in the pixel of interest. In the same manner, De2 in Equation (17) above is an accumulative adjustment value for correcting the target occurrence value N2 of the rearward-forward dot pairs, and, and shown in FIG. 24C, the accumulative adjustment value De2 is obtained such that diffusion values (D2/4) of adjustment values (adjustment values of the number of rearward-forward dot pairs) D2 generated when the peripheral pixels adjacent to the upper left, immediate upper, upper right and left of the pixel of interest are respectively focused are accumulated in the pixel of interest. Accordingly, such diffusion values (D/4, D1/4, and D2/4) or accumulative adjustment values De, De1, and De2 correspond to the target occurrence rate errors.

Each of the adjustment values D, D1, and D2 is obtained based on Equations (18) to (20) given below.

$$D=NX-Dr \quad (18)$$

$$D1=NX1-Dr1 \quad (19)$$

$$D2=NX2-Dr2 \quad (20)$$

Dr is an occurrence value set to a different value according to the occurrence/non-occurrence of the dot pairs, and set to 255 or 0 in this modified example. In the same manner, Dr1 is an occurrence value set to a different value according to the occurrence/non-occurrence of the forward-rearward dot pairs, and set to 255 or 0 in the modified example. In the same manner, Dr2 is an occurrence value set to a different value according to the occurrence/non-occurrence of the rearward-forward dot pairs, and set to 255 or 0 in the modified example.

As obvious from Equations (13) and (14) above, NX·k1, NX1·k2, and NX2·k2 can be said as offset amounts for the threshold value th, and such offset amounts is a kind of an evaluation index obtained based on a target number, which is set in advance for the number of dot pairs. Process from Step S640 to Step S665 which can be executed by the halftone processing section P2c after the threshold value th is set in any of Steps S630, S633, and S636 in the same as FIGS. 9 and 14 as described hitherto.

When dots are to be formed in a pixel of interest, in Step S670, the halftone processing section P2c performs the same determination as in Step S460 (FIG. 14). In addition, when forward-rearward dot pairs are generated in the pixel of interest (more precisely, when the forward-rearward dot pairs are generated by the pixel of interest and pixels adjacent to the left side by forming dots in the pixel of interest), the occurrence values Dr, Dr1, and Dr2 are respectively set to Dr=255, Dr1=255, and Dr2=0 (Step S680). When rearward-forward dot pairs are generated in the pixel of interest (more precisely, when the rearward-forward dot pairs are generated by the pixel of interest and pixels adjacent to the left side by forming dots in the pixel of interest), the occurrence values Dr, Dr1, and Dr2 are respectively set to Dr=255, Dr1=0, and Dr2=255 (Step S683). In other cases (where it is decided that dots are not formed in the pixel of interest, and where dots are formed in the pixel of interest but not formed in the pixel adjacent to the left side), all of the occurrence values Dr, Dr1, and Dr2 are set to 0 (Step S686). Of course, the occurrence values Dr, Dr1, and Dr2, which are set for the pixel of interest in that manner, are used for the generation of each of the adjustment values D, D1, and D2 for the pixel of interest, and the generated adjustment values D, D1, and D2 are dispersed in near non-processed pixels (refer to FIG. 24).

According to the modified example, when dot pairs (either of forward-rearward dot pairs or rearward-forward dot pairs) are generated, 255 as the occurrence value Dr is deducted during the calculation of adjustment values D of the number of dot pairs, and the calculated adjustment values D are diffused to the near non-processed pixels, and thereby to be reflected on the accumulative adjustment value De of the near pixels. According to Equations (13), (14), and (15) above, as the accumulative adjustment value De has a smaller value, the threshold value th is offset by a greater value. Accordingly, occurrence of dot pairs is suppressed around places where dot pairs have occurred, and the dispersibility of dot pairs is ensured.

According to the modified example, when forward-rearward dot pairs are generated, 255 as the occurrence value Dr1 is deducted during the calculation of the adjustment value D1 of the forward-rearward dot pairs, and the calculated adjustment values D1 are diffused to the near non-processed pixels, and thereby to be reflected on the accumulative adjustment value De1 of the near pixels. According to Equations (13) and (16) above, as the accumulative adjustment value De1 has a smaller value, the threshold value th is offset by a greater value. Accordingly, occurrence of forward-rearward dot pairs is suppressed around places where forward-rearward dot pairs have occurred, and the dispersibility of the forward-rearward dot pairs is ensured. Further according to the modified example, when rearward-forward dot pairs are generated, 255 as the occurrence value Dr2 is deducted during the calculation of the adjustment value D2 of the rearward-forward dot pairs, and the calculated adjustment values D2 are diffused to the near non-processed pixels, and thereby to be reflected on the accumulative adjustment value De2 of the near pixels. According to Equations (14) and (17) above, as the accumulative adjustment value De2 has a smaller value, the threshold value th is offset by a greater value. Accordingly, occurrence of rearward-forward dot pairs is suppressed around places where rearward-forward dot pairs have occurred, and the dispersibility of the rearward-forward dot pairs is ensured.

Further according to the modified example, when dot pairs can be generated ("Yes" in Step S610), based on Equations (13), (14), and (15), the threshold value th is offset into the offset amount (NX·k1) that has the target occurrence value N as an element according to the grayscale value dc of the pixel of interest. In this case, as the target occurrence value N gets greater, the threshold value th tends to be offset by a smaller value. In other words, since the likeliness of the occurrence of dot pairs changes in proportion to the size the target occurrence value N in the pixel of interest (as the target occurrence value N gets greater, dot pairs are easily generated), as a result, halftone data in which the number of dot pairs approximates to an ideal number according to grayscale of the input image data.

Further according to the modified example, when forward-rearward dot pairs can be obtained (the process advances from Step S620 to Step S630), based on Equations (13) and (16), the threshold value th is offset into the offset amount (NX1·k2) that has the target occurrence value N1 of forward-rearward dot pairs as an element according to the grayscale value dc of the pixel of interest. In this case, as the target occurrence value N1 gets greater, the threshold value th tends to be offset by a smaller value. In other words, since the likeliness of the occurrence of forward-rearward dot pairs increases in proportion to the size of the target occurrence value N1 in the pixel of interest, as a result, halftone data in which the number of forward-rearward dot pairs approximates to an ideal number according to grayscale of the input image data. Further according to the modified example, when rearward-forward dot pairs can be obtained (the process advances from Step S620 to Step S633), based on Equations (14) and (17), the threshold value th is offset into the offset amount (NX2·k2) that has the target occurrence value N2 of rearward-forward dot pairs as an element according to the grayscale value dc of the pixel of interest. In this case, as the target occurrence value N2 gets greater, the threshold value th tends to be offset by a smaller value. In other words, since the likeliness of the occurrence of rearward-forward dot pairs increases in proportion to the size of the target occurrence value N2 in the pixel of interest, as a result, halftone data in which the number of rearward-forward dot pairs approximates to an ideal number according to grayscale of the input image data.

In other words, according to the modified example, a halftone result can be obtained which has ideal factor in all of the dispersibility of all dot pairs, the dispersibility of forward-rearward dot pairs, the dispersibility of rearward-forward dot pairs, the sum of dot pairs, the number of forward-rearward dot pairs, and the number of rearward-forward dot pairs. Moreover, since N1=N2 as described above, the number of forward-rearward dot pairs and the number of rearward-forward dot pairs to be generated are basically the same. In addition, the effect brought by the ideal number of dot pairs is as described in Modified Example 2 above.

C-7. Modified Example 7

Furthermore, Step S170C may be executed instead of Steps S170, S170A, and S170B of the embodiment described above, and the potential value PI may be calculated instead of the granularity index GI in Step S170C.

Figure 21:
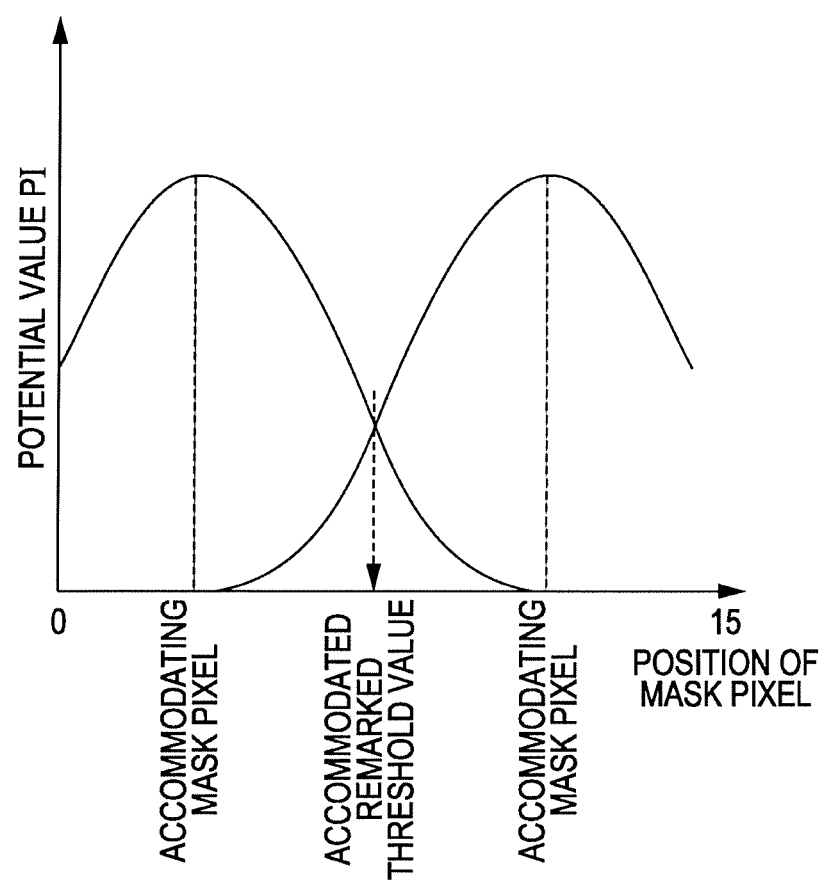
FIG. 21 is a graph describing the calculation of a potential value PI.

FIG. 21 schematically shows the calculation of the potential value PI. Potential is generated mainly in a mask pixel in which dots are formed in the dot maps for groups GD1 to GD11. In the example of FIG. 21, potential in the Gauss function shape is generated. In Step S170C, the potential value PI of each non-accommodating mask pixel is calculated by sequentially generating potential mainly in pixels in which dots are formed. By linearly combining the potential value PI in the same manner as the granularity index GI, the evaluation index EI can be obtained. According to the potential value PI, proximity of dots to each other is suppressed, and as a result, the dots can be dispersed spatially. In addition, according to the potential value PI, since Fourier transform is not necessary, the dither mask M can be prepared at a high speed.

C-8. Modified Example 8

In Steps S170, S170A, and S170B of the embodiment described above, the dispersibility index calculating portion P1c3 calculates the granularity index GI as an index for evaluating the dispersibility of dots, but other indexes may be calculated. In the modified example, Step S170D is executed instead of Step S170 of the embodiment shown in FIG. 4, Steps 170A and 170B described above. When Step S170D of the modified example is executed instead of Step S170, a Root Mean Square (RMS) granularity degree RI is calculated instead of the granularity index GI. The RMS granularity degree RI is a root-mean-square for the grayscale value of mask pixels of the dot maps for groups GD1 to GD8 of groups G1 to G8. According to the RMS granularity degree RI, since Fourier transform is not necessary, the dither mask M can be prepared at a high speed. By linearly combining the RMS granularity degree RI in the same manner as the granularity index GI, the evaluation index EI can be obtained. In addition, when the RMS granularity degree RI is calculated, the grayscale value of mask pixels of the dot maps for groups GD1 to GD8 may be weighted spatially. For example, as the VTF described above, weighting is performed according to the visual sensitivity characteristic of spatial frequency, and then the RMS granularity degree RI may be calculated.

C-9. Modified Example 9

In the embodiment above, the evaluation is performed for the groups G1 to G8, but some of the groups may not be considered. For example, by omitting evaluation for the groups G2 and G3, the dither mask M may be prepared at a high speed. In addition, in the embodiment, the dot map for group GD8 is generated based on the premise that dots have the same shape, but when, for example, a printer is assumed to form dots in a number of sizes, dot shapes in a number of sizes may be added to the dot map for group GD8. Moreover, taking a landing direction of ink drops into consideration, dots in an ellipse shape that has a long diameter in the main scanning direction may be added to the dot map for group GD8.

C-10. Modified Example 10

In addition, the embodiment and each of the modified examples are exemplified to be independent, but technical ideas thereof may be combined for the implementation. For example, the dither mask M may be generated by using the evaluation index EI resulting from linear combination of all of the potential value PI and the granularity index GI that is calculated based on the dot maps for groups GD1 to GD11 for the groups G1 to G11 of the embodiment and modified examples described above. In doing so, the dither mask M can be generated taking into consideration all dot overlaps caused by dot shapes, dot overlaps caused by deviation in landing positions of ink drops, and dot overlaps between inks. In addition, which cause should be considered is different depending on performance of the printer 20, and characteristics of ink and print sheets, and therefore, which one out of the dot maps for groups GD8 to GD11 is to be incorporated into the evaluation index EI may be switched according to such performance of the printer 20, and characteristics of ink and print sheets. Moreover, the invention is not limited to the generation of a dot map for group GD for individually evaluating all dot overlaps caused by dot shapes, dot overlaps caused by deviation in landing positions of ink drops, and dot overlaps between inks, but a dot map for group GD which can comprehensively evaluate such causes may be generated. For example, when the dot map generating portion P1c1 generates the dot maps for groups GD9 and GD10 in Step S140A of Modified Example 2, if a dot shape is added and then a dot map is deviated, the dot maps for groups GD9 and GD10, which can evaluate dot overlaps caused by both of the dot shape and deviation in landing positions of ink drops, can be generated. Furthermore, for example, when the dot map generating portion P1c1 may generate the dot map for group GD12 by overlapping the dot maps for groups GD9 and GD10 in Step S140A of Modified Example 2, the granularity index GI for the dot map for group GD12 may be calculated in Step S170A. The granularity index GI for the dot map for group GD12 or the like is added as an element of the evaluation index EI in Step S200B, and thereby the dither mask M that ensures the dispersibility of all dot pairs (forward-rearward dot pairs and rearward-forward dot pairs) can be generated.

C-11. Modified Example 11

In the embodiment and modified examples described above, formation of a printed image by a single print head 21 performing the main scanning plural times is exemplified, but, the technique of the invention can be applied to printing that uses a plurality of print heads. Here, the pass decomposing matrix shown in FIG. 3 is considered to be a head decomposing matrix, and it is assumed that the main scanning passes (1 and 3) are assigned to the first print head and the main scanning passes (2 and 4) are assigned to the second print head. In this case, the dot map for group GD2 corresponding to the main scanning passes (1 and 3) of the embodiment shows the distribution of dots formed by the first print head, and the dot map for group GD3 corresponding to the main scanning passes (2 and 4) shows the distribution of dots formed by the second print head. Accordingly, the dot maps for groups GD9 and GD10 generated by deviating and putting together the dot maps for groups GD2 and GD3 as shown in FIG. 13 indicates dot overlaps generated by position deviation of the first and second print heads. Therefore, by adding the granularity index GI of the dot maps for groups GD9 and GD 10 to the evaluation index EI, uneven color or the like can be prevented even when position deviation of the first and second print heads occurs.

C-12. Modified Example 12

In Modified Example 4, the dither mask M is shared between C and M ink, and the reference position of the dither mask M is deviated between the inks, but dither masks may be individually prepared for each ink. For example, when the dither mask M is prepared in advance for C ink, the technique of the invention can be applied to the generation of the dither mask M for M ink. In this modified example, the dot map for group GD1 shown in FIG. 18 can be considered as being obtained by subjecting solid image data of the amount of M ink of which the remarked threshold value S is added with 1 by using the dither mask M of M ink under generation, to a halftone process. Then, the dot map of M ink shown in FIG. 18 can be considered as one obtained such that solid image data of the amount of C ink of which the remarked threshold value S is added with 1 by using the generated dither mask M of C ink are subjected to the halftone process. By overlapping such dot maps, the dot overlap of C and M inks can be evaluated. In doing so, even when difference dither masks M are used between C and M inks, printing excellent in dot dispersibility among plural inks can be realized.

C-13. Modified Example 13

In the embodiment and modified examples, the halftone process is performed in the computer 10, but it may be possible that the dither mask M generated in the technique of the invention is incorporated in a printer and a halftone process by the dithering method is performed in the printer, or a halftone process by the error diffusion method according to the modified examples described above is performed in the printer. In this case, good image quality can be realized.

The invention claimed is:

1. A printing apparatus, comprising:
a halftone unit that performs a halftone process for determining dot formation for each pixel based on a grayscale value of the pixel constituting image data; and
a print controlling unit that causes the dot formation determined by the halftone unit on a recording medium by causing a print head which ejects ink drops during a main scanning in a first direction and ejects ink drops during the main scanning in a second direction, which is opposite to the first direction to be driven,
the halftone unit obtaining an evaluation index based on a target number which is set in advance for a first number of first dot pairs that generate dot overlap between each of the first dot pairs by a position deviation and a second number of second dot pairs that are far from each other between each of the second dot pairs by the position deviation so that the first number and the second number are the same, each of the first and second dot pairs being constituted by a first dot formed by the main scanning in the first direction and a second dot formed by the main scanning in the second direction, and performing the halftone process based on the evaluation index.

2. The printing apparatus according to claim 1, wherein the halftone process is based on an error diffusion method and a threshold value for determining the possibility of dot formation, of which dots constitute the dot pairs, varies according to the evaluation index.

3. The printing apparatus according to claim 1, wherein the halftone process is based on a dithering method, a dither mask, for which characteristics to generate the dot pairs are optimized based on the evaluation index, is generated in advance, and the possibility of dot formation is determined by using the generated dither mask.

4. A printing method, comprising:
performing a halftone process for determining dot formation for each pixel based on a grayscale value of the pixel constituting image data; and
print controlling for causing the dot formation determined by the halftone unit on a recording medium by causing a print head which ejects ink drops during a main scanning in a first direction and ejects ink drops during the main scanning in a second direction, which is opposite to the first direction to be driven,
in the halftoning, an evaluation index being obtained based on a target number which is set in advance for a first number of first dot pairs that generate dot overlap between each of the first dot pairs by a position deviation and a second number of second dot pairs that are far from each other between each of the second dot pairs by the position deviation so that the first number and the second number are the same, each of the first and second dot pairs being constituted by a first dot formed by the main scanning in the first direction and a second dot formed by the main scanning in the second direction, and
the halftone process being performed based on the evaluation index.

5. A method of generating a dither mask, of which the dither mask is used in a halftone process for determining dot formation for each pixel based on a grayscale value of the pixel constituting image data, the generating of the dither mask comprising:
calculating an evaluation index every time when a threshold value for determining the dot formation is accommodated in each of mask pixels, which constitute the dither mask, the evaluation index including an index indicating a difference between a sum of a first number of first dot pairs and a second number of second dot pairs, and a target number of the first dot pairs and the second dot pairs that is set in advance according to the threshold value, the first dot pairs generating dot overlap between each of the first dot pairs by a position deviation, the second dot pairs being far from each other between each of the second dot pairs by the position deviation, each of the first and second dot pairs being constituted by a first dot formed by a main scanning in a first direction and a second dot formed by the main scanning in a second direction, which is opposite to the first direction, during printing; and
accommodating the threshold value in each of mask pixels that corresponds to the minimum evaluation index.

* * * * *